United States Patent
Kang et al.

(10) Patent No.: US 11,493,688 B2
(45) Date of Patent: Nov. 8, 2022

(54) OPTICAL MODULE

(71) Applicant: ELECTRONICS AND TELECOMMUNICATIONS RESEARCH INSTITUTE, Daejeon (KR)

(72) Inventors: Sae-Kyoung Kang, Daejeon (KR); Jongtae Song, Daejeon (KR); Joon Young Huh, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 254 days.

(21) Appl. No.: 16/891,259

(22) Filed: Jun. 3, 2020

(65) Prior Publication Data

US 2020/0386941 A1    Dec. 10, 2020

(30) Foreign Application Priority Data

| Jun. 4, 2019 | (KR) | 10-2019-0066127 |
| Jul. 4, 2019 | (KR) | 10-2019-0080620 |
| Feb. 5, 2020 | (KR) | 10-2020-0013905 |
| Jun. 2, 2020 | (KR) | 10-2020-0066373 |

(51) Int. Cl.
*G02B 6/12* (2006.01)
*G02B 6/293* (2006.01)
(Continued)

(52) U.S. Cl.
CPC ......... *G02B 6/12007* (2013.01); *G02B 6/287* (2013.01); *G02B 6/2938* (2013.01);
(Continued)

(58) Field of Classification Search
None
See application file for complete search history.

(56) References Cited

U.S. PATENT DOCUMENTS

| 9,331,096 B2 | 5/2016 | Pinguet et al. |
| 9,813,152 B2 | 11/2017 | Pinguet et al. |

(Continued)

FOREIGN PATENT DOCUMENTS

KR    10-0596406 B1    7/2006

OTHER PUBLICATIONS

Takahiro Nakamura et al., "Fingertip-Size Optical Module, "Optical I/O Core",and Its Application in FPGA," IEICE Trans. Electron., vol. E102-C, No. 4, p. 333,(Apr. 2019).

(Continued)

*Primary Examiner* — Jerry Rahll
(74) *Attorney, Agent, or Firm* — LRK Patent Law Firm

(57) ABSTRACT

An optical module includes an interface electrically connected to an external device to receive a data signal to be transmitted, a signal processor configured to perform serialization and signal modulation on the received data signal, an optical transceiver configured to generate an optical transmission signal by receiving a direct current (DC) light source, in which a plurality of light sources having different wavelengths are multiplexed, from an optical power supply and performing optical modulation thereon through the serialized and modulated data signal, and an optical fiber connector configured to output the generated optical transmission signal to the external device and receive an optical reception signal from the external device.

11 Claims, 24 Drawing Sheets

(51) Int. Cl.
  *H04B 10/40* (2013.01)
  *G02B 6/287* (2006.01)
  *H04B 10/27* (2013.01)
  *H04B 10/60* (2013.01)
  *H04B 10/25* (2013.01)

(52) U.S. Cl.
  CPC ............ *H04B 10/25* (2013.01); *H04B 10/27* (2013.01); *H04B 10/40* (2013.01); *H04B 10/60* (2013.01)

(56) References Cited

U.S. PATENT DOCUMENTS

| | | |
|---|---|---|
| 10,608,408 B1 * | 3/2020 | Lin ...................... G02B 6/4246 |
| 2014/0153873 A1 | 6/2014 | Kang et al. |
| 2014/0169389 A1 | 6/2014 | Kim et al. |
| 2015/0078758 A1 * | 3/2015 | Lee .......................... H04J 14/02 398/135 |
| 2018/0164520 A1 | 6/2018 | Epitaux et al. |
| 2019/0020438 A1 * | 1/2019 | Kang ................ H04B 10/0799 |

OTHER PUBLICATIONS

Radhakrishnan Nagarajan et al., "Silicon Photonics-Based 100 Gbit/s, PAM4, DWDM Data Center Interconnects," J. Opt. Commun. Netw. vol. 10, No. 7, B25, (Jul. 2018).

Thierry Pinguet et al., "25 Gb/s Silicon Photonic Transceivers," IEEE, (2012).

* cited by examiner

OPTICAL MODULE

CROSS-REFERENCE TO RELATED APPLICATION(S)

This application claims the priority benefit of Korean Patent Application No. 10-2019-0066127 filed on Jun. 4, 2019, Korean Patent Application No. 10-2019-0080620 filed on Jul. 4, 2019, Korean Patent Application No. 10-2020-0013905 filed on Feb. 5, 2020, and Korean Patent Application No. 10-2020-0066373 filed on Jun. 2, 2020, in the Korean Intellectual Property Office, the disclosures of which are incorporated herein by reference for all purposes.

BACKGROUND

1. Field of the Invention

One or more example embodiments relate to a structure of an optical module that functions as an optical transmission and reception interface in a data center network.

2. Description of Related Art

An optical module is a device that modulates an electrical signal into an optical signal, or receives an optical signal and converts the optical signal into an electrical signal. The optical module performs optical connection for high-speed signal transmission in a data center network. With an increase in the amount of data to be transmitted through an optical module, there is a demand for high-speed, small-size, and low-price optical transmitter and optical receiver which are the main blocks.

Such an optical transceiver may be implemented by integrating an optical device and an electronic device in a limited space. Silicon photonics capable of manufacturing large amounts of optical transceivers through a silicon wafer process is a technology suitable for size and cost reduction. Although it was predicted for years that small-size, low-price, and high-speed optical transceivers become commercially available through silicon-based photonics technology, the commercialization has been delayed due to the slow progress in solving the issues of silicon photonics-based optical devices related to insertion loss characteristics, thermal characteristics, and polarization characteristics.

SUMMARY

An aspect provides a method of securing thermal stability of DC light sources and high level of light source performance (optical output intensity, relative intensity noise, and line width) by providing, in an optical module, an optical power supply outputting the DC light sources to be spaced apart from a main heat source such as an electronic device included in an optical transceiver.

An aspect provides a method that may solve issues such as insertion loss, temperature dependency, and polarization dependency loss using silica optical waveguide-based wavelength multiplexer and wavelength demultiplexer, when compared to silicon photonics-based wavelength multiplexer and wavelength demultiplexer.

According to an aspect, there is provided an optical module including an interface electrically connected to an external device to receive a data signal to be transmitted, a signal processor configured to perform serialization and signal modulation on the received data signal, an optical transceiver configured to generate an optical transmission signal by receiving a direct current (DC) light source, in which a plurality of light sources having different wavelengths are multiplexed, from an optical power supply and performing optical modulation thereon through the serialized and modulated data signal, and an optical fiber connector configured to output the generated optical transmission signal to the external device and receive an optical reception signal from the external device, wherein the optical power supply may be spaced a predetermined distance apart from a main heat source present in the optical module and connected to the optical transceiver through a DC light source optical fiber, and the optical transmission signal may be generated when the DC light source output from the optical power supply is split for each wavelength through a light source wavelength demultiplexer included in a silica optical waveguide-based multiplexing block of the optical transceiver, optically modulated respectively through an optical modulating device included in a silicon photonics-based optical device block of the optical transceiver, and then multiplexed through an optical transmission wavelength multiplexer included in the multiplexing block.

A transmission optical fiber and a reception optical fiber connected to the optical fiber connector and the DC light source optical fiber connected to the optical power supply may be connected to the optical fiber connector of the optical transceiver in the form of a multi-optical fiber connector.

A transmission optical fiber, a reception optical fiber, and the DC light source optical fiber may perform a primary optical alignment with the multiplexing block based on a light intensity measured when an alignment optical signal input through a first alignment optical fiber is split through a first optical splitter according to a predetermined split ratio, passes through a second optical splitter via a first alignment optical waveguide, and reaches a second alignment optical fiber.

The primary optical alignment may be completed when the light intensity of the alignment optical signal reaching the second alignment optical fiber is at maximum.

The silica optical waveguide-based multiplexing block and the silicon photonics-based optical device block constituting the optical transceiver may perform a secondary optical alignment based on a light intensity measured when an alignment optical signal input through a first alignment optical fiber is split through a first optical splitter according to a predetermined ratio, passes through the optical device block via a second alignment optical waveguide, and reaches a second alignment optical fiber through a second optical splitter.

The secondary optical alignment may be completed when the light intensity of the alignment optical signal reaching the second alignment optical fiber is at maximum.

According to another aspect, there is an optical module including an optical transceiver configured to receive an optical reception signal through an optical fiber connector connected to an external device and convert the received optical reception signal into a data signal, a signal processor configured to perform signal demodulation and deserialization on the converted data signal, and an interface electrically connected to the external device to transmit the demodulated and deserialized data signal, wherein the optical reception signal may be received through the optical fiber connector, split for each wavelength through an optical reception wavelength demultiplexer included in a silica optical waveguide-based multiplexing block of the optical transceiver, converted into a voltage signal through a photodiode included in a silicon photonics-based optical device block of the optical transceiver, processed through the signal processor, and transmitted to the external device through the interface.

The photodiode may be implemented in a surface-illuminated structure or an optical waveguide-applied structure according to the optical reception performance and optical coupling structure of the optical transceiver.

The optical module may further include an optical power supply spaced a predetermined distance apart from a main heat source present in the optical module and connected to the optical transceiver through a DC light source optical fiber.

The DC light source optical fiber connected to the optical power supply and a transmission optical fiber and a reception optical fiber connected to the optical fiber connector may perform a primary optical alignment with the multiplexing block based on a light intensity measured when an alignment optical signal input through a first alignment optical fiber is split through a first optical splitter according to a predetermined split ratio, passes through a second optical splitter via a first alignment optical waveguide, and reaches a second alignment optical fiber.

The silica optical waveguide-based multiplexing block and the silicon photonics-based optical device block constituting the optical transceiver may perform a secondary optical alignment based on a light intensity measured when an alignment optical signal input through a first alignment optical fiber is split through a first optical splitter according to a predetermined ratio, passes through the optical device block via a second alignment optical waveguide, and reaches a second alignment optical fiber through a second optical splitter.

According to another aspect, there is an optical module including an interface electrically connected to an external device to receive a data signal to be transmitted, a signal processor configured to perform serialization and signal modulation on the received data signal, an optical transceiver configured to generate an optical transmission signal by receiving at least one DC light source having the same wavelength from an optical power supply and performing optical modulation thereon through the serialized and modulated data signal, and an optical fiber connector configured to output the generated optical transmission signal to the external device and receive an optical reception signal from the external device, wherein the optical power supply may be spaced a predetermined distance apart from a main heat source present in the optical module and connected to the optical transceiver through at least one DC light source optical fiber, and the optical transmission signal may be generated when the at least one DC light source having the same wavelength output from the optical power supply is split through a light source optical splitter included in a silica optical waveguide-based optical coupling block of the optical transceiver and optically modulated respectively through an optical modulating device included in a silicon photonics-based optical device block of the optical transceiver, and the generated optical transmission signal is then output to the external device through a plurality of transmission optical fibers via a transmission optical waveguide included in the optical coupling block.

A plurality of transmission optical fibers and a plurality of reception optical fibers connected to the optical fiber connector and the DC light source optical fiber connected to the optical power supply may perform a primary optical alignment with the multiplexing block based on a light intensity measured when an alignment optical signal input through a first optical splitter according to a predetermined split ratio, passes through a second optical splitter via a first alignment optical waveguide, and reaches a second alignment optical fiber.

The primary optical alignment may be completed when the light intensity of the alignment optical signal reaching the second alignment optical fiber is at maximum.

The silica optical waveguide-based optical coupling block and the silicon photonics-based optical device block constituting the optical transceiver may perform a secondary optical alignment based on a light intensity measured when an alignment optical signal input through a first alignment optical fiber is split through a first optical splitter according to a predetermined ratio, passes through the optical device block via a second alignment optical waveguide, and reaches a second alignment optical fiber through a second optical splitter.

The secondary optical alignment may be completed when the light intensity of the alignment optical signal reaching the second alignment optical fiber is at maximum.

According to another aspect, there is an optical module including an optical transceiver configured to receive an optical reception signal through an optical fiber connector connected to an external device and convert the received optical reception signal into a data signal, a signal processor configured to perform signal demodulation and deserialization on the converted data signal, and an interface electrically connected to the external device to transmit the demodulated and deserialized data signal, wherein the optical reception signal may be received through the optical fiber connector, split for each wavelength through a reception optical waveguide included in a silica optical waveguide-based optical coupling block of the optical transceiver, transmitted to a silicon photonics-based optical device block of the optical transceiver, converted into a voltage signal through a photodiode included in the optical device block, processed through the signal processor, and transmitted to the external device through the interface.

The optical module may further include an optical power supply spaced a predetermined distance apart from a main heat source present in the optical module and connected to the optical transceiver through at least one DC light source optical fiber.

A plurality of transmission optical fibers and a plurality of reception optical fibers connected to the optical fiber connector and the DC light source optical fiber connected to the optical power supply may perform a primary optical alignment with the multiplexing block based on a light intensity measured when an alignment optical signal input through a first alignment optical fiber is split through a first optical splitter according to a predetermined split ratio, passes through a second optical splitter via a first alignment optical waveguide, and reaches a second alignment optical fiber.

The silica optical waveguide-based optical coupling block and the silicon photonics-based optical device block constituting the optical transceiver may perform a secondary optical alignment based on a light intensity measured when an alignment optical signal input through a first alignment optical fiber is split through a first optical splitter according to a predetermined ratio, passes through the optical device block via a second alignment optical waveguide, and reaches a second alignment optical fiber through a second optical splitter.

According to example embodiments, it is possible to secure thermal stability of DC light sources and high level of light source performance by providing, in an optical module, an optical power supply outputting the DC light sources to be spaced apart from a main heat source such as an electronic device included in an optical transceiver.

According to example embodiments, it is possible to solve issues such as insertion loss, temperature dependency, and polarization dependency loss using silica optical waveguide-based wavelength multiplexer and wavelength demultiplexer, when compared to silicon photonics-based wavelength multiplexer and wavelength demultiplexer.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION OF THE INVENTION

Hereinafter, example embodiments will be described in detail with reference to the accompanying drawings.

Figure 1A:
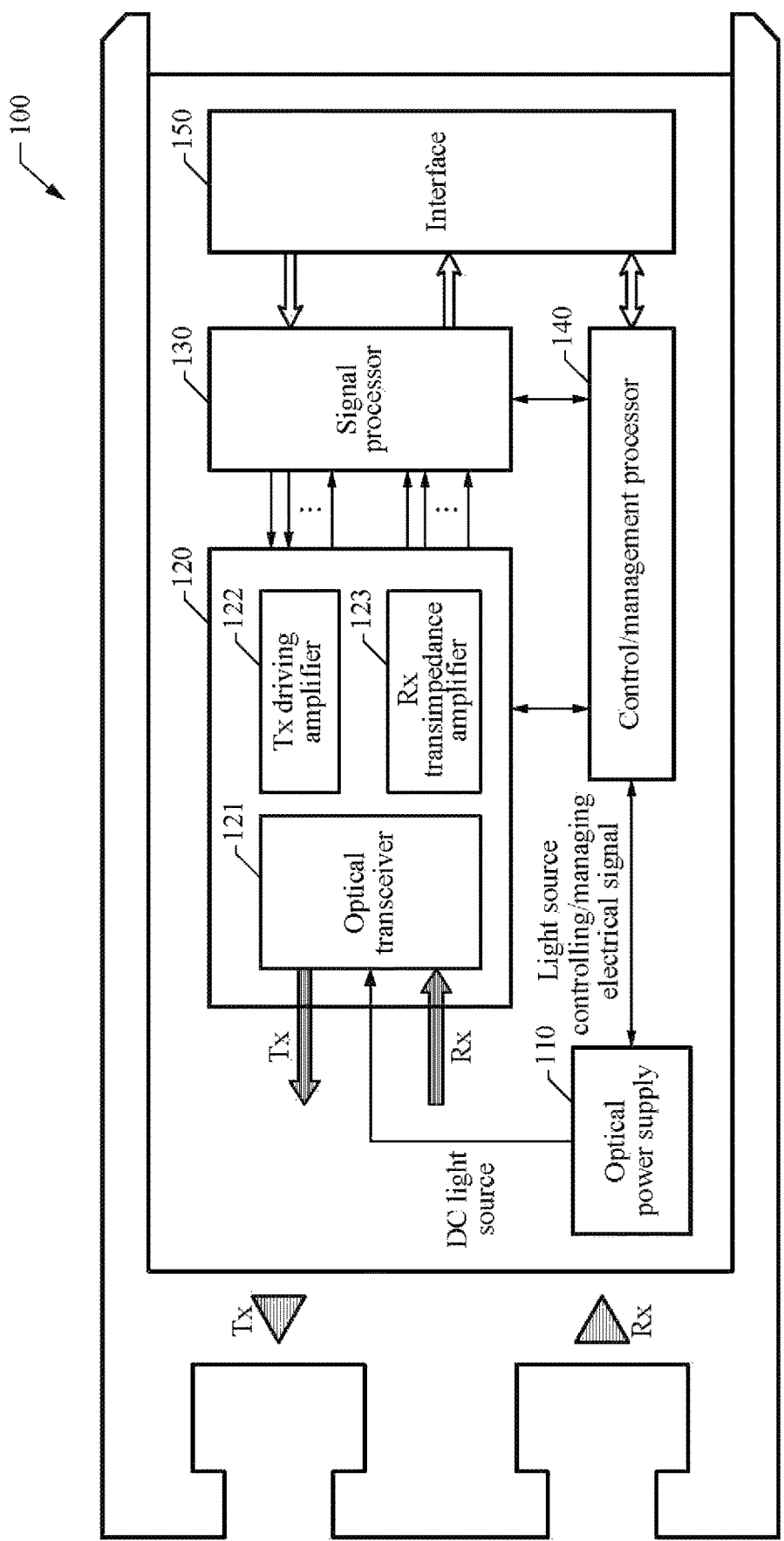
FIGS. 1A and 1B illustrate a structure of an optical module according to a first example embodiment.
Figure 1B:
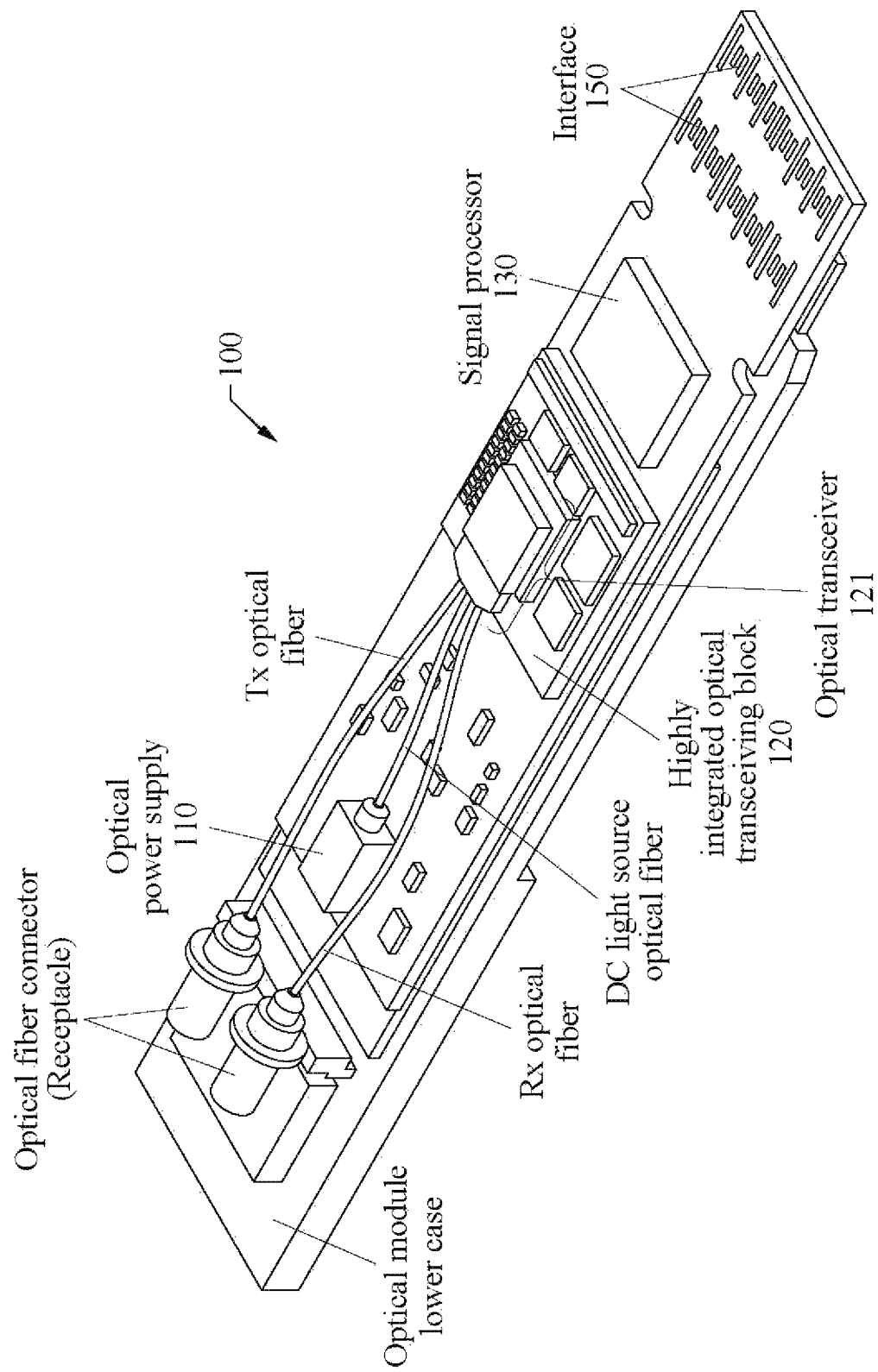

FIGS. 1A and 1B illustrate a structure of an optical module according to a first example embodiment.

In detail, FIG. 1A is a plan view of an optical module 100 according to the first example embodiment, and FIG. 1B is a perspective view of the optical module 100. Referring to FIGS. 1A and 1B, the optical module 100 may include an optical power supply 110, a highly integrated optical transceiving block 120, a signal processor 130, a control/management processor 140, and an interface 150. In this example, the highly integrated optical transceiving block 120 may include an optical transceiver 121 including a silica optical waveguide-based multiplexing block and a silicon photonics-based optical device block, a transmission driving amplifier (driver IC) 122, that is, an optical transmission and reception amplifier which is an electronic device that amplifies optical signals transmitted and received, and a reception transimpedance amplifier (TIA) 123. The highly integrated optical transceiving block 120 may be integrated on a separate sub-board and connected in a form mounted on a main board of the optical module 100, as shown in FIG. 1B.

Meanwhile, the optical power supply 110 may be spaced a predetermined distance apart from a main heat source (for example, electronic device) present in the optical module 100, and may supply a direct current (DC) light source carrying no data signal to the optical transceiver 121. In this example, the performance of the DC light source including the center wavelength and the light output intensity of the DC light source output from the optical power supply 110 is controlled/managed through the control/management processor 140 disposed on the main board of the optical module 100.

As described above, the optical module 100 may dispose the optical power supply 110, configured to output the DC light source, independently at a predetermined location in the optical module 100 to be spaced apart from the main heat source such as an electronic device, thereby blocking the heat generated by the main heat source not to be transmitted to the optical power supply 110. In addition, through the arrangement, the optical module 100 may supply a high-level DC light source to the optical transceiver 121 through fine adjustment of the control/management processor 140.

Further, the optical module 100 may supply a DC light source with sufficiently high light intensity output for silicon photonics-based optical devices having high insertion loss characteristics by disposing the optical power supply 11 outside the highly integrated optical transceiving block 120, thereby transmitting optical signals farther.

The flow of signals according to optical transmission and optical reception through the internal function blocks of the optical module 100 of FIGS. 1A and 1B will be described as below. First, the flow of an optical transmission signal is as follows. The optical module 100 may receive a data signal to be transmitted through the interface 150 electrically connected to an external device. The optical module 100 may perform signal processing such as serialization and signal modulation on the data signal received through the signal processor 130. The modulated data signal output from the signal processor 130 may be applied to the transmission driving amplifier 122 included in the highly integrated optical transceiving block 120, amplified to a sufficient amplitude, and optically modulated through the optical transceiver 121 according to the modulated data signal. The optical modulation function may be performed through a silicon photonics-based optical modulating device included in a silicon photonics-based optical device block of the optical transceiver 121 and the optical power supply 110 disposed outside of the highly integrated optical transceiving block 120.

The optical power supply 110 may perform wavelength-multiplexing on DC light sources having different wavelengths output through a plurality of light sources, and supply the DC light sources to the optical transceiver 121 of the highly integrated optical transceiving block 120 through a single DC light source optical fiber connected to the external device. In this example, the DC light source optical fiber between the optical power supply 110 and the optical transceiver 121 may include a polarization-maintaining optical fiber (PMF) used to maintain polarization, or a general single-mode optical fiber (SMF) used if there is no big problem with polarization.

In detail, the DC light sources having different wavelengths multiplexed and output by the optical power supply 110 may be received by a silica optical waveguide-based multiplexing block of the optical transceiver 121, and applied to the silicon photonics-based optical modulating device after wavelength division for each channel by the light source wavelength demultiplexer. Then, the DC light sources applied to the optical modulating device may be optically modulated through the signal processor 130 according to the modulated data signal and then multiplexed by an optical transmission wavelength multiplexer included in the multiplexing block. An optical transmission signal generated through the multiplexing may be optically coupled with a transmission optical fiber and transmitted to the external device through a receptacle-type optical fiber connector arranged in an optical transmission port of the optical module 100.

Next, the flow of an optical reception signal is as follows. An optical reception signal in which a plurality of wavelengths are multiplexed may be input through a receptacle-type optical fiber connector arranged in an optical reception port of the optical module 100. The input optical reception signal may be applied to the optical transceiver 121 included in the highly integrated optical transceiving block 120 through the reception optical fiber, and converted into a current signal by an optical detection device of the optical device block after wavelength division for each channel by an optical reception wavelength demultiplexer included in the multiplexing block. The converted current signal may be converted into a voltage signal and amplified by the reception transimpedance amplifier 123 included in the highly integrated optical transceiving block 120. The converted and amplified electrical signal may be applied to the signal processor 130, and transmitted to the external device through the interface 150 after signal processing such as signal modulation and deserialization.

In this example, a photodiode (PD) of the optical detection device included in the optical device block of the optical transceiver 121 may be implemented as a silicon photonics-based optical waveguide-applied PD and/or a surface incidence PD, or may be implemented as a compound-based PD.

Figure 2:
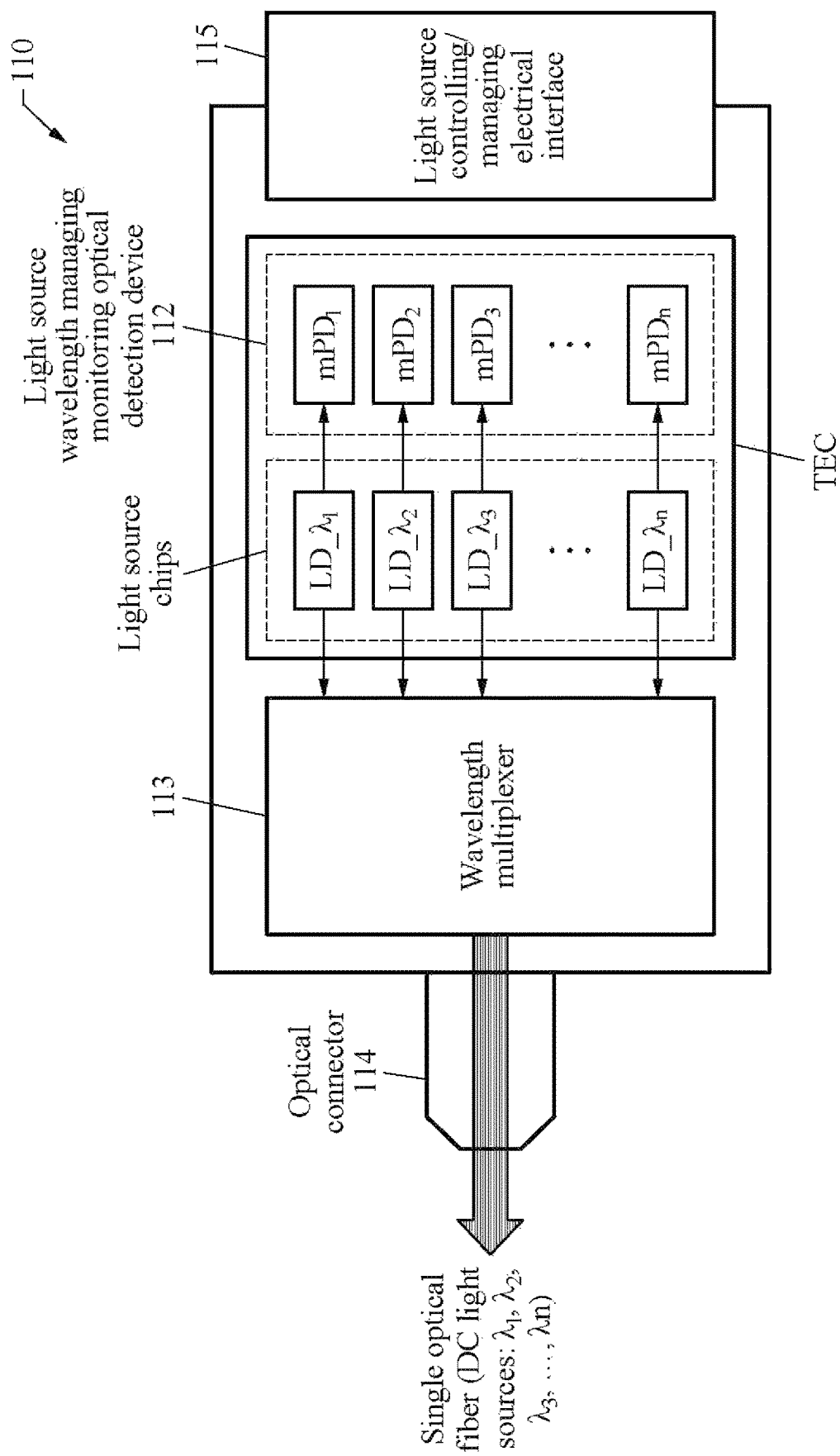
FIG. 2 illustrates a structure of an optical power supply according to the first example embodiment.

FIG. 2 illustrates a structure of an optical power supply according to the first example embodiment.

Referring to FIG. 2, the optical power supply 110 may include light source chips 111 configured to supply different wavelengths, a light source managing monitoring optical detection device 112 configured to monitor and correct the center wavelength and light output intensity of a DC light source output from each of the light source chips 111, a wavelength multiplexer 113, an optical connection unit 114, and a light source controlling/managing electrical interface 115.

In this example, the optical connection unit 114 may include an optical isolator, wherein the optical isolator may block optical signals not to enter the light source chips 111 LD_$\lambda_1$, LD_$\lambda_2$, LD_$\lambda_3$, . . . , LD_$\lambda_n$ in the optical power supply 110, thereby preventing a decrease in the performance of the light source chips 111, wherein the optical signals may be reflected and returned by (i) the connection between optical fiber connectors, (ii) the connection between the optical fiber connector and the wavelength multiplexer and the wavelength demultiplexer of the multiplexing block, and (iii) the connection between the wavelength multiplexer and the wavelength demultiplexer of the multiplexing block and the optical device block.

Referring to FIG. 2, the optical power supply 110 may include a thermo-electric cooler (TEC) configured to manage the operating temperature of the light source chips 111 and the center wavelength of the output DC light source. The optical power supply 110 may output a DC optical signal not including a data signal and transmit the optical signal to the optical transceiver 121 through a DC light source optical fiber, wherein the used DC light source optical fiber may be implemented as a PMF or an SMF.

FIGS. 3A through 3D illustrate the structure of the optical module according to the first example embodiment.

Figure 3A:
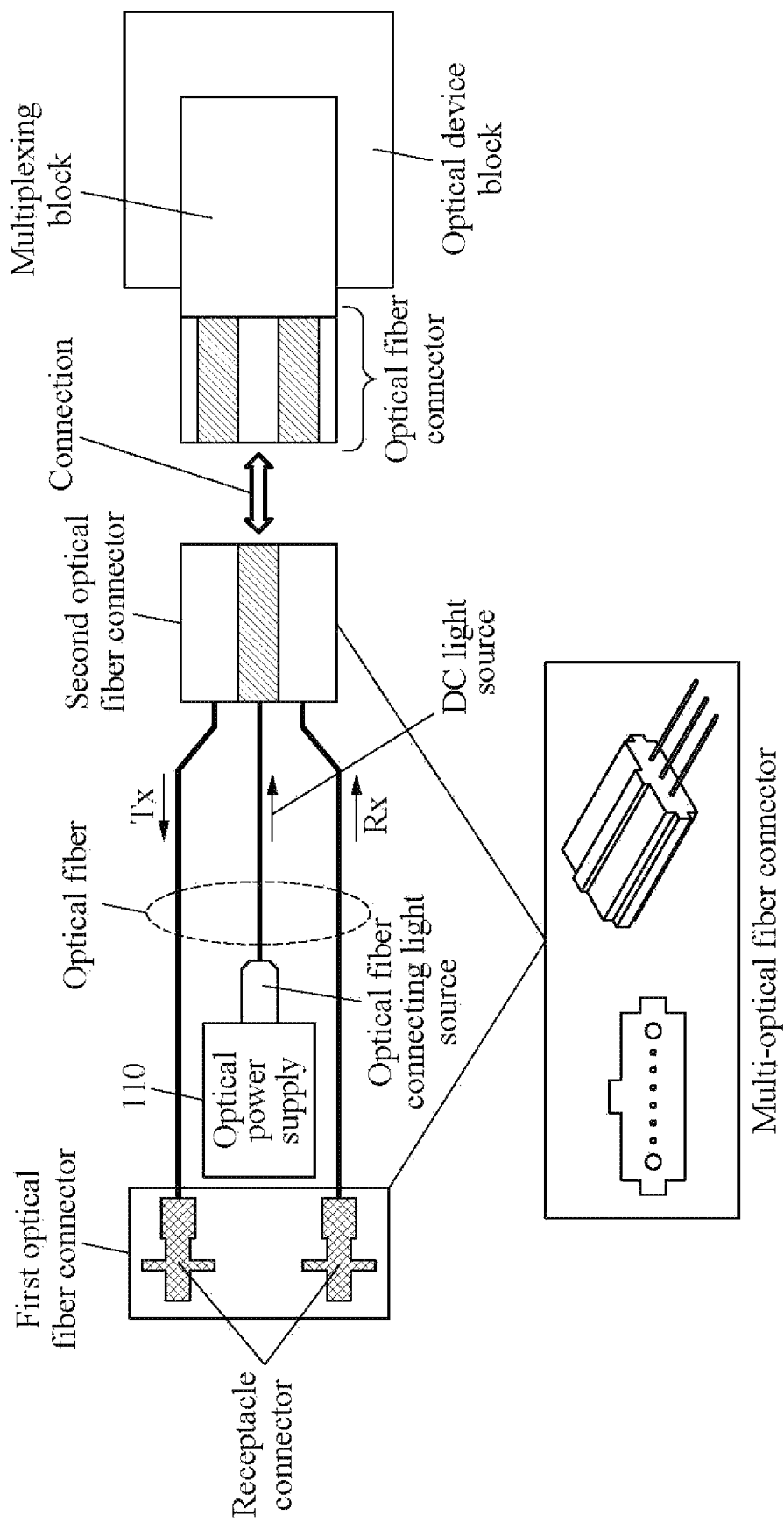
FIGS. 3A through 3D illustrate the structure of the optical module according to the first example embodiment.

Referring to FIG. 3A, the optical transceiver 121 may include a multiplexing block and an optical device block including a wavelength multiplexer and a wavelength demultiplexer. In this example, the optical device block may include an optical coupling device that is optically coupled to the wavelength multiplexer and the wavelength demultiplexer, an optical modulating device configured to optically modulate an optical transmission signal as an optical transmitter, and a photodiode being an optical detection device configured to convert an optical reception signal into an electrical signal as an optical receiver.

In detail, the optical transceiver 121 may transmit/receive the optical transmission signal and the optical reception signal through a receptacle-type first optical fiber connector and an optical fiber. In this example, the optical transceiver 121 may align, in the multiplexing block, optical fibers used to transmit and receive the optical transmission signal and the optical reception signal through a second optical fiber connector and an optical fiber connector. In this example, the first optical fiber connector and the second optical fiber connector may be implemented in the form of a multi-optical fiber connector.

Figure 3B:
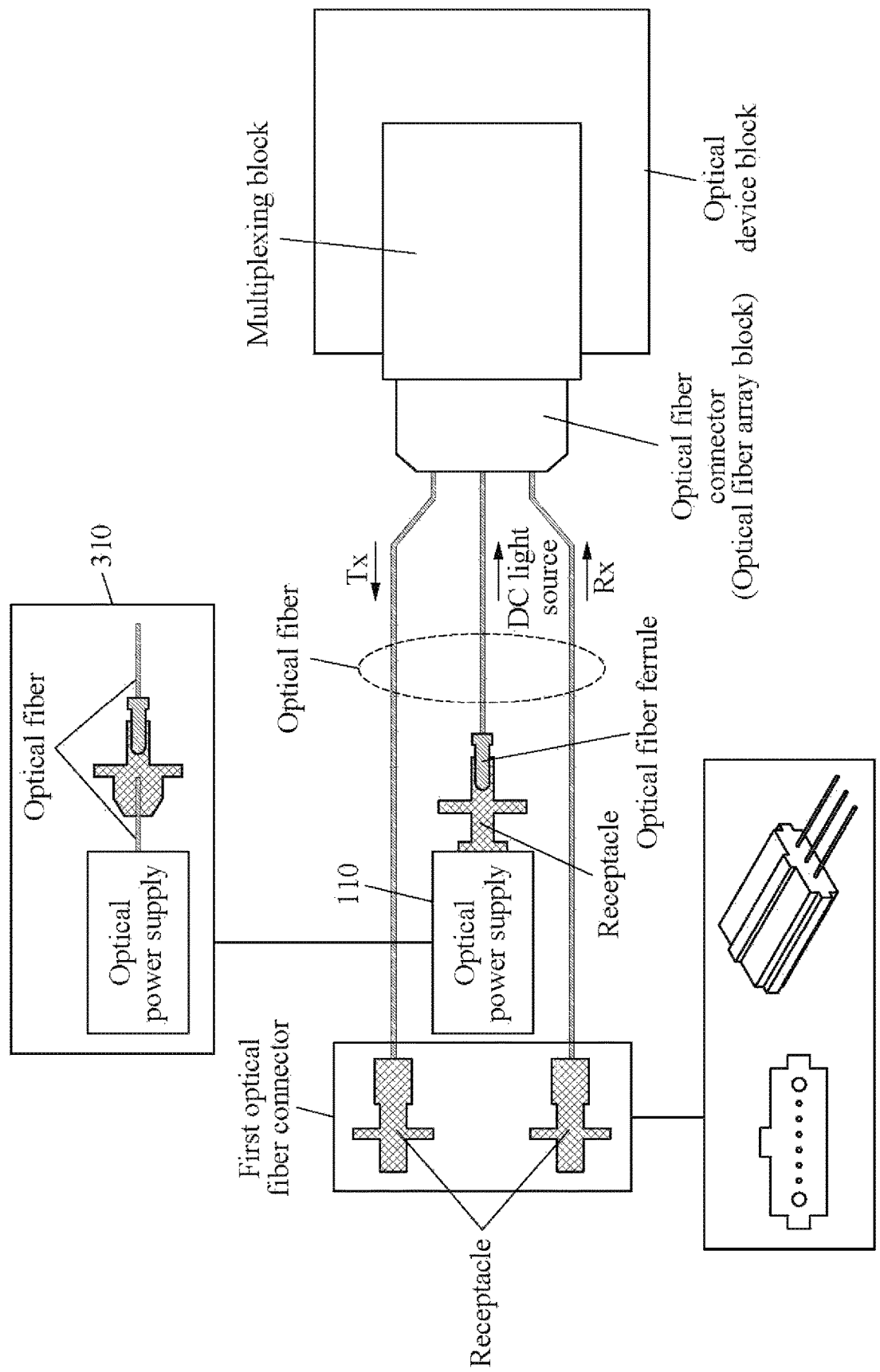

FIG. 3B shows an example in which the optical fiber connector is implemented in the form of an optical fiber array block coupled to the multiplexing block. The optical fiber array block may be connected to the optical power supply 110 and the optical fiber in the same manner as in the structure described above. In this example, the end of the optical fiber connected to the optical power supply 110 may be processed in the form of an optical fiber ferrule to be coupled to a receptacle since the connector of the optical power supply 110 usually has a shape of a receptacle. As described above, the optical module 100 may implement an output terminal of the optical power supply 110 as a receptacle and implement one end of the DC light source optical fiber as an optical fiber ferrule to be inserted into the receptacle, such that the receptacle and the optical fiber ferrule may have the structure to be coupled to each other, which allows each part to be implemented independently and arranged and assembled flexibly.

Further, the optical power supply 110 may be configured such that a separate optical fiber is drawn out from the main body of the optical power supply 110 and processes the end with a receptacle, as shown in the additional box 310 of FIG. 3B. In this case, the optical module 100 may provide a degree of freedom in the position in which the optical power supply 110 is disposed, and a degree of freedom in the connection structure with the wavelength multiplexer and the wavelength demultiplexer included in the multiplexing block.

Meanwhile, the first optical fiber connector may be provided in the form of a receptacle for the transmission optical fiber and the reception optical fiber that are optically interfaced with the outside of the optical module 100, and may be implemented in the form of a multi-optical fiber connector to accommodate a plurality of optical fibers.

Figure 3C:
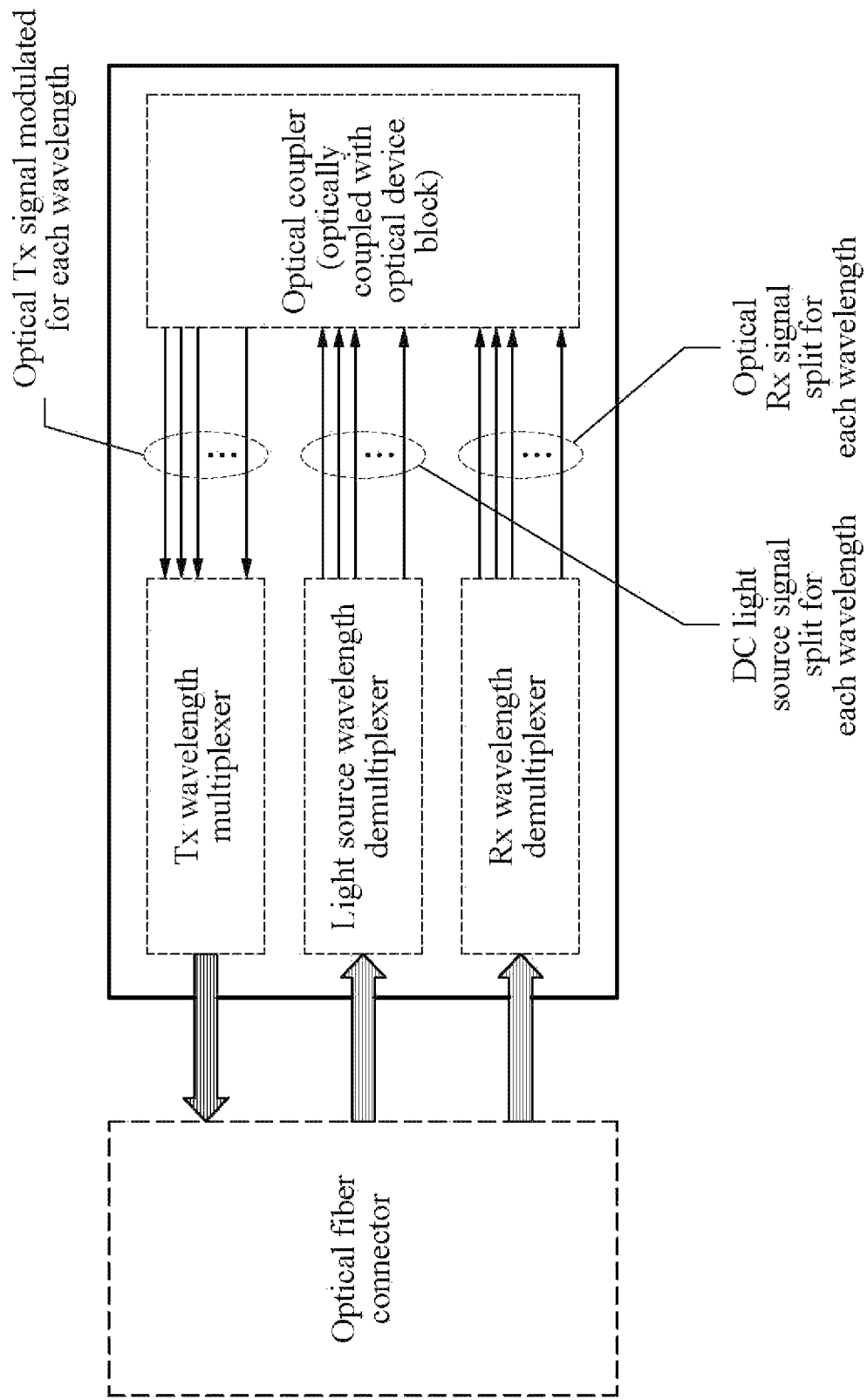

Referring to FIG. 3C, a multiplexing block of the optical transceiver 121 may include an optical transmission wavelength multiplexer, a DC light source wavelength demultiplexer, an optical reception wavelength demultiplexer, and an optical coupler. In this example, the wavelength multiplexer and the wavelength demultiplexer of the multiplexing block may be formed based on a silica optical waveguide. In addition, the optical coupler may refer to an optically coupled portion (optical signal connection between internal chips) between the multiplexing block including the wavelength multiplexer and the wavelength demultiplexer and the silicon photonics-based optical device block, and may be implemented by various optical coupling methods such as lateral optical coupling between chips or vertical optical coupling.

Therefore, the wavelength multiplexer and the wavelength demultiplexer may be connected to the external device through optical fiber connection at both ends, and optically connect to the optical device block through the optical coupler. In this example, the optical fiber connector coupled to the wavelength multiplexer and the wavelength demultiplexer may be provided in the form of a connector capable of multi-optical fiber connection, and may be connected to the second optical fiber connector of FIG. 3A in the form of a male-female matching connector.

Figure 3D:
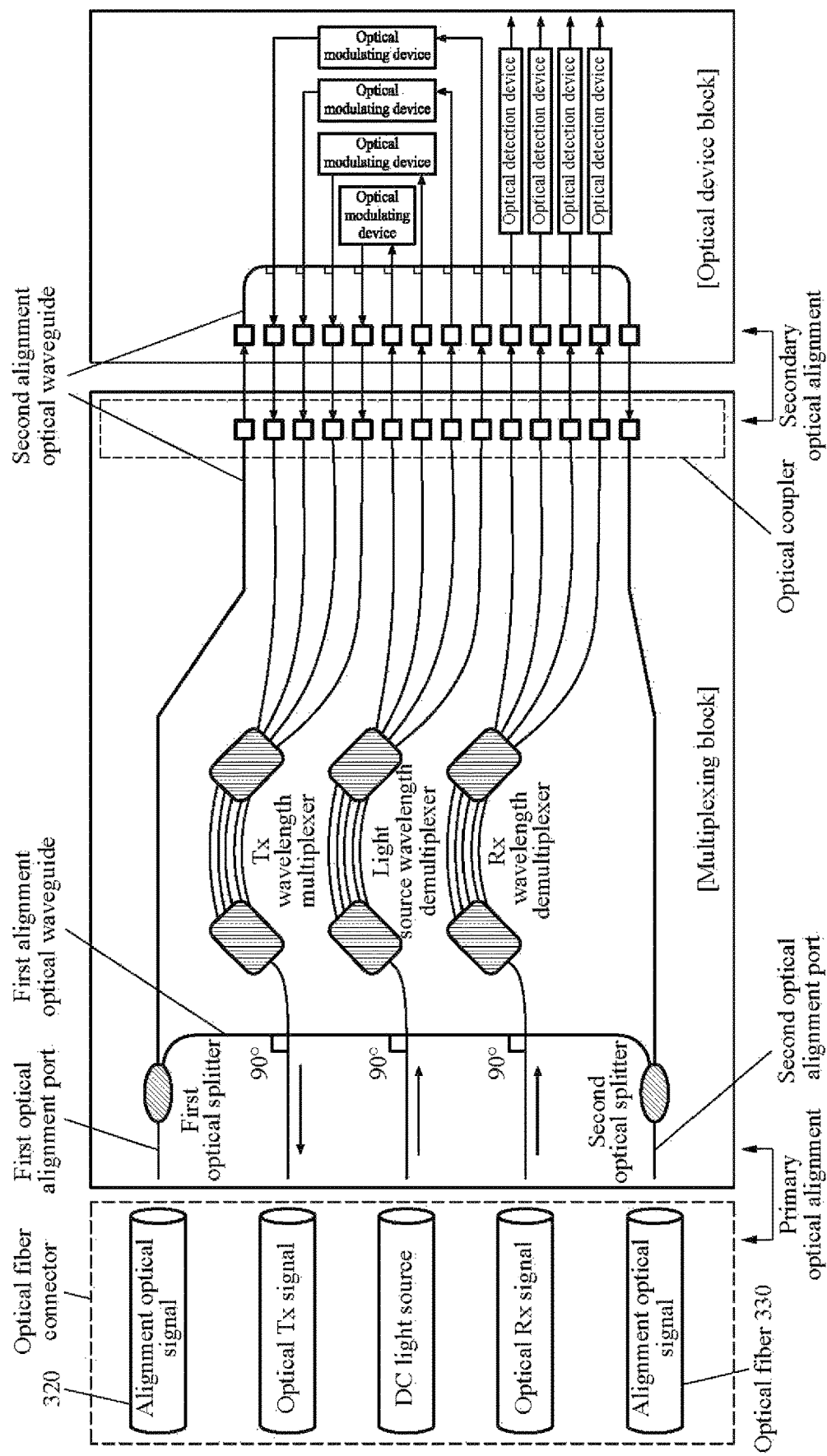

FIG. 3D shows the detailed configuration of the multiplexing block according to an example embodiment. Referring to FIG. 3D, the multiplexing block may include surplus arrangement optical waveguides (a first arrangement optical waveguide and a second arrangement optical waveguide including optical splitters), an optical transmission wavelength multiplexer, a light source wavelength demultiplexer, an optical reception wavelength demultiplexer, and an optical coupler.

In detail, the DC light source optical fiber connected to the optical power supply 110 and the transmission optical fiber and the reception optical fiber connected to the first optical fiber connector may be connected to the multiplexing block through the optical fiber connector. In this example, the transmission optical fiber, the reception optical fiber, and the DC light source optical fiber may be in optical alignment with the multiplexing block through the method as below.

In detail, the transmission optical fiber, the reception optical fiber, and the DC light source optical fiber may perform a primary optical alignment with the multiplexing block based on a light intensity measured when an alignment optical signal input through a first alignment optical fiber 320 is split through a first optical splitter according to a predetermined split ratio, passes through a second optical splitter via a first alignment optical waveguide, and reaches a second alignment optical fiber 330. In this example, the optical module 100 may monitor the light intensity of the alignment optical signal reaching the second alignment optical fiber 330 and complete the primary optical alignment at a point at which the light intensity is at maximum.

Thereafter, the other alignment optical signal split through the first optical splitter may be used for optical alignment and coupling between the silica optical waveguide-based multiplexing block and the silicon photonics-based optical device block.

In further detail, a secondary optical alignment may be performed based on a light intensity measured when an alignment optical signal input through the first alignment optical fiber 320 is split through the first optical splitter according to a predetermined ratio, passes through the optical device block via a second alignment optical waveguide, and reaches the second alignment optical fiber 330 through the second optical splitter. In this example, the optical module 100 may monitor the light intensity of the alignment optical signal reaching the second alignment optical fiber 330 and complete the secondary optical alignment at a point at which the light intensity is at maximum.

Meanwhile, the first alignment optical waveguide and the second alignment optical waveguide may be implemented on a single plane. The first alignment optical waveguide and the second alignment optical waveguide may be arranged to intersect with each other 90 degrees, to minimize a loss caused by physical interference (coupling) occurring when intersecting with the signal (for example, transmission signal, DC light source, and reception signal) optical waveguides. As described above, the magnitude of the optical coupling between optical waveguides arranged to intersect with each other 90 degrees may be negligible. Finally, after the primary optical alignment and the secondary optical alignment are completed, the optical module 100 may remove the surplus alignment optical fibers (the first alignment optical signal and the second alignment optical signal).

Figure 4A:
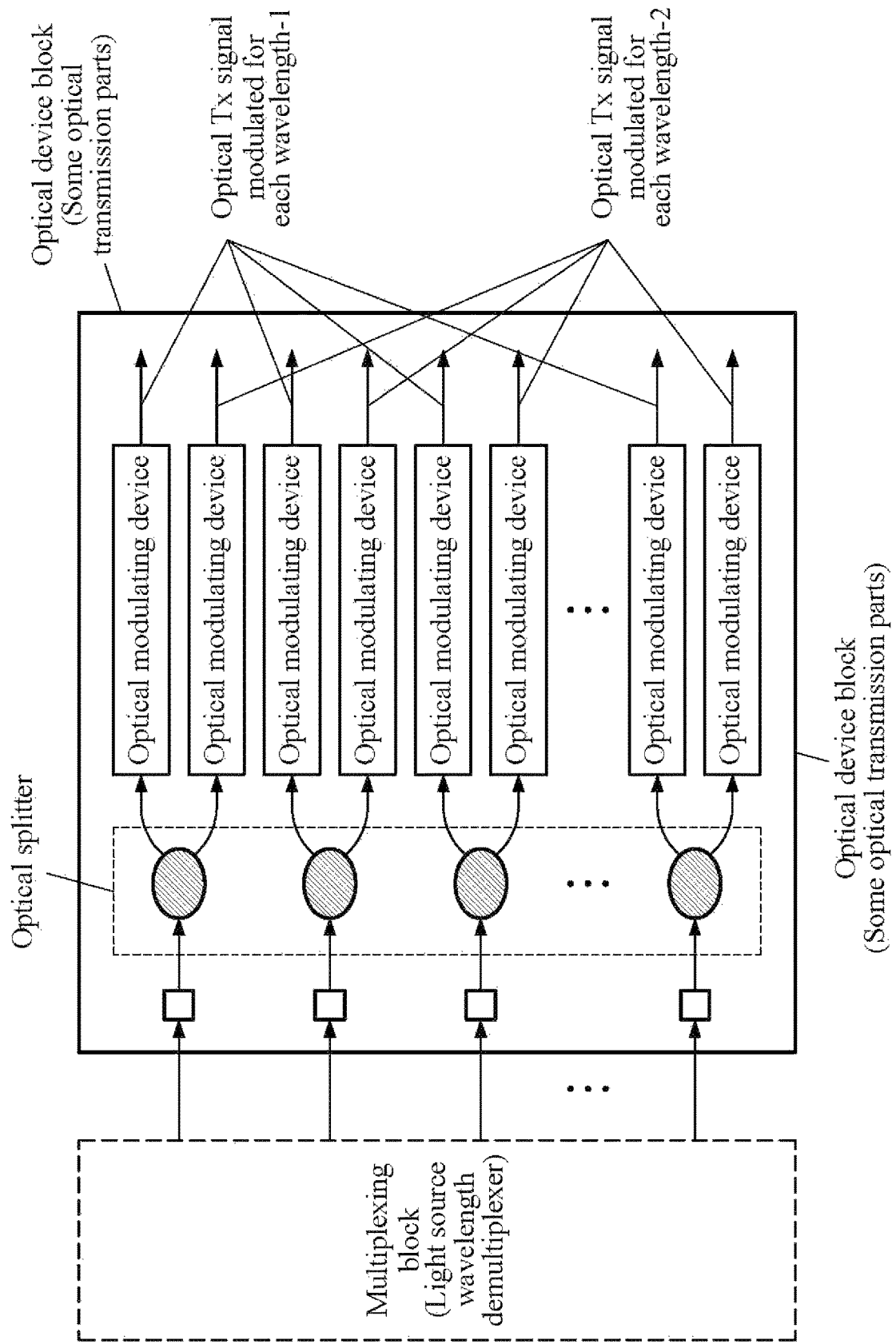
FIGS. 4A through 4C illustrate a structure for increasing a transmission capacity of the optical module according to the first example embodiment.
Figure 4B:
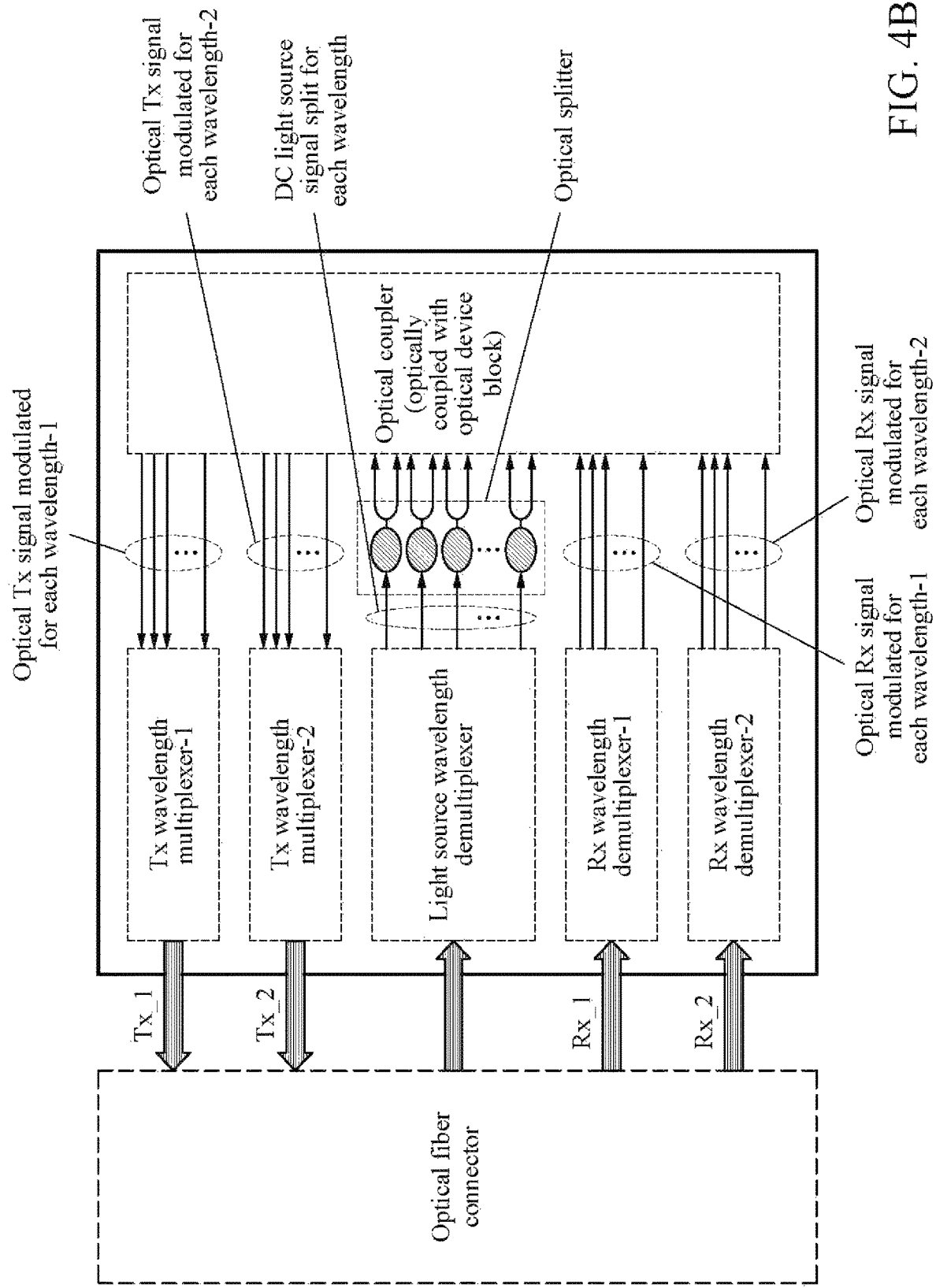
Figure 4C:
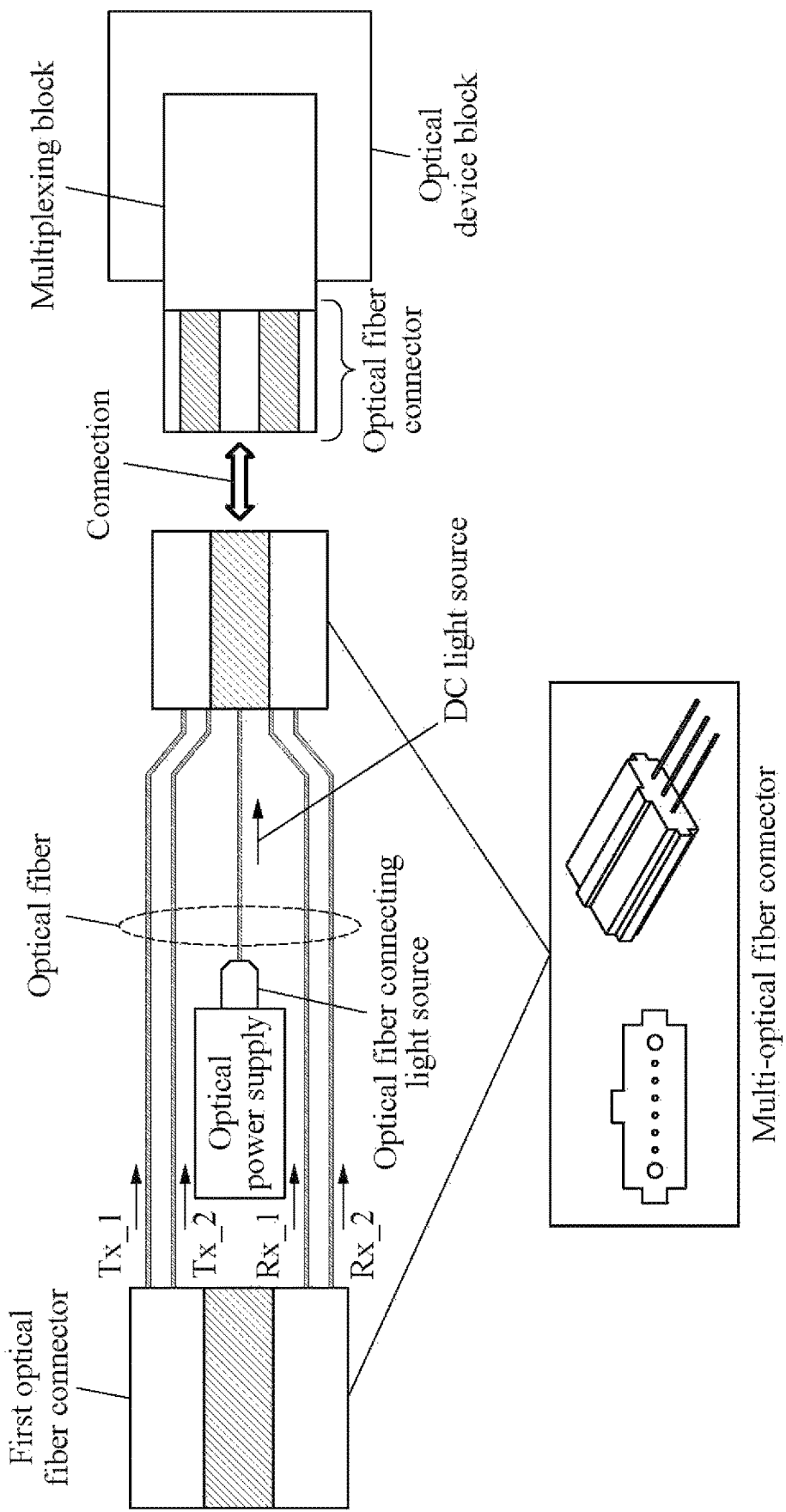

FIGS. 4A through 4C illustrate a structure for increasing a transmission capacity of the optical module according to the first example embodiment.

FIGS. 4A and 4B show a structure that may double the transmission capacity for optical transmission and optical reception, when compared to the structure of the optical module 100 described above. Referring to FIG. 4A, if a sufficiently great optical power for each channel is supplied from the optical power supply 110, the optical module 100 may generate modulated optical signals of an optical transmission signal-1 (Tx_1) and an optical transmission signal-2 (Tx_2) by embedding optical splitters in optical transmission part of an optical device block, splitting channels having the same wavelength by 1:2, and applying the split channels to respective optical modulating devices. In this example, the optical splitters may be extended to 1:N to increase the transmission capacity or to perform a predetermined function. Thereafter, the optical module 100 may multiplex the plurality of modulated optical transmission signals through a wavelength demultiplexer included in a multiplexing block and transmit the multiplexed optical signals to the external device through transmission optical fibers.

In this example, a first optical fiber connector connected to the external device may be implemented in the form of a multi-optical fiber connector capable of accommodating a plurality of optical fibers as shown in FIG. 4C. In addition, a second optical fiber connector may have the same connection structure as in the optical fiber connection method described with reference to FIG. 3A.

When the optical splitters are applied as described above, the optical power for each channel is reduced to ½, and thus the optical power supply 110 should a DC light source for each channel in a sufficient intensity such that the optical transceiver 121 of the highly integrated optical transceiving block 120 may receive the DC light source.

In the case of optical reception, two optical signals wavelength-multiplexed through the first optical fiber connector of the optical module 100, that is, an optical reception signal-1 (Rx_1) and an optical reception signal-2 (Rx_2), may be received, split for each wavelength through an optical reception wavelength demultiplexer-1 and an optical reception wavelength demultiplexer-2, applied to the optical device block, converted into electrical signals, and interfaced with the external device through the interface 150.

FIG. 4B shows a structure for increasing the transmission capacity or increasing the number of channels, wherein the optical splitters are disposed in the multiplexing block, unlike the example of FIG. 4A. When light sources having different wavelengths from the optical power supply 110 are multiplexed and applied to the multiplexing block, the DC light sources may be first split for each wavelength through a light source wavelength demultiplexer included in the multiplexing block. Thereafter, as shown in FIG. 4B, channels having the same wavelength may be distributed by 1:2 or 1:N by the optical splitters disposed at the rear end of the light source wavelength demultiplexer. Subsequently, optically modulated optical signals (the optical transmission signal-1 and the optical transmission signal-2 modulated for each wavelength) may be generated through the optical modulating devices disposed in the optical transmission parts in the optical device block. The generated modulated optical signals may be respectively multiplexed again through the optical transmission wavelength multiplexer-1 and the optical transmission wavelength multiplexer-2 of the multiplexing block and transmitted to the external device through the first optical fiber connector.

Figure 5A:
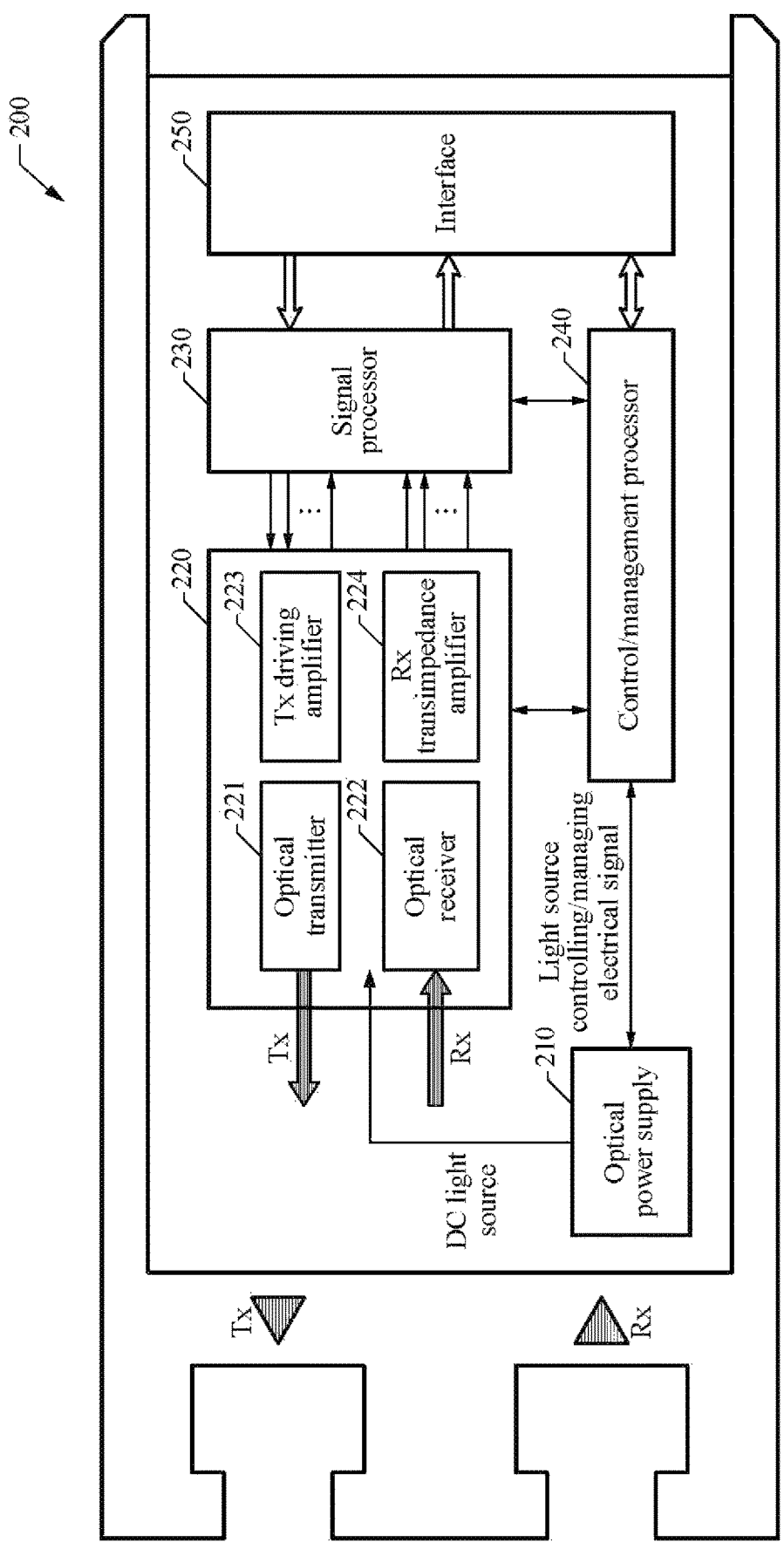
FIGS. 5A and 5B illustrate a structure of an optical module according to a second example embodiment.
Figure 5B:
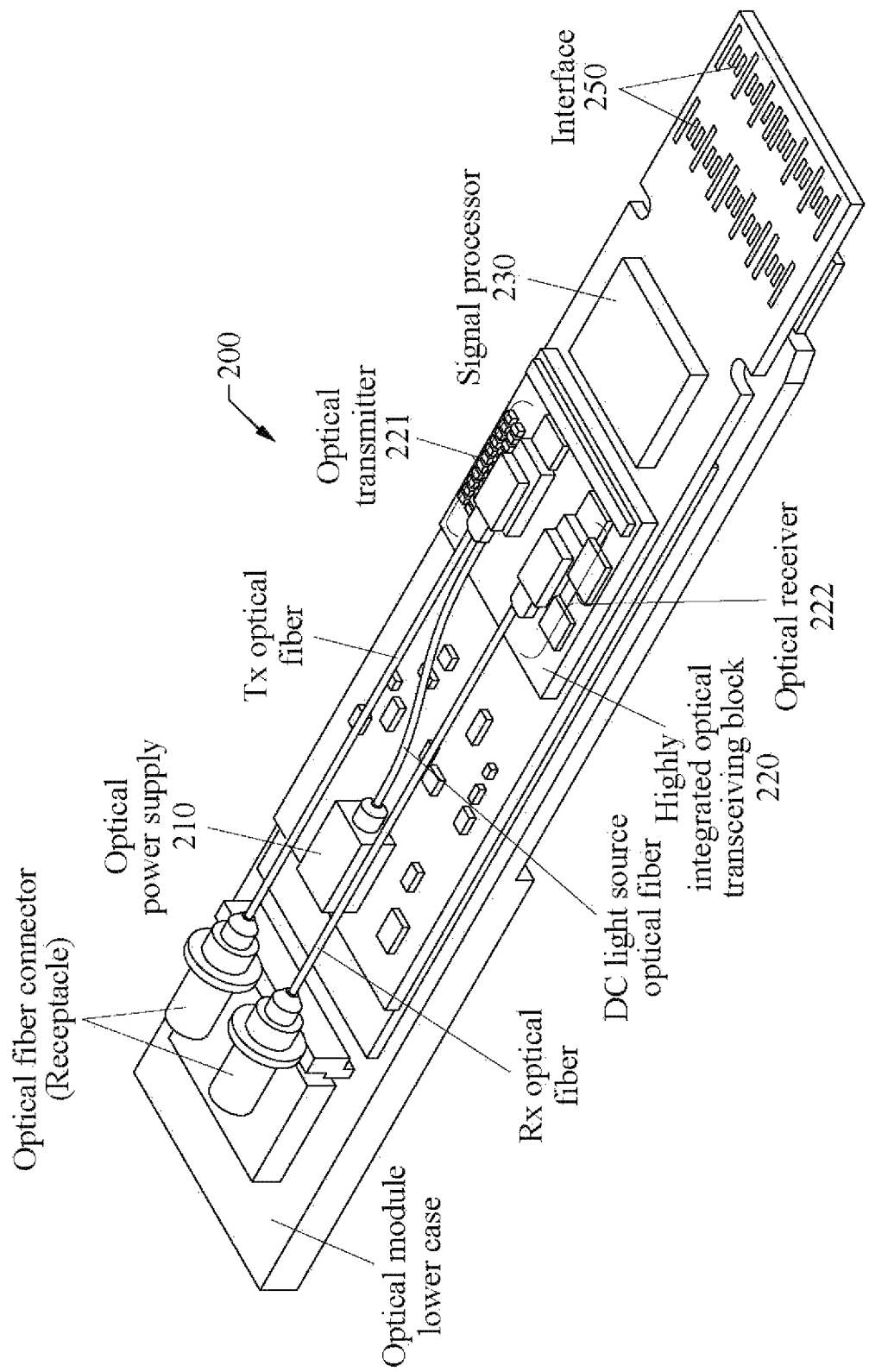

FIGS. 5A and 5B illustrate a structure of an optical module according to a second example embodiment.

Referring to FIGS. 5A and 5B, a structure of an optical module 200 according to the second example embodiment may be similar to the structure of the optical module 100 according to the first embodiment. However, there is a slight difference in the internal configuration of a highly integrated optical transceiving block 220. Referring to FIGS. 5A and 5B, the highly integrated optical transceiving block 220 may have a structure in which an optical transmitter 221 and an optical receiver 222 are separated in view of the optical characteristics of the optical devices and the easy manufacturing of the optical module 200. Since the operation of the second example embodiment is similar to that of the first example embodiment, a detailed description thereof will be omitted here.

Figure 6A:
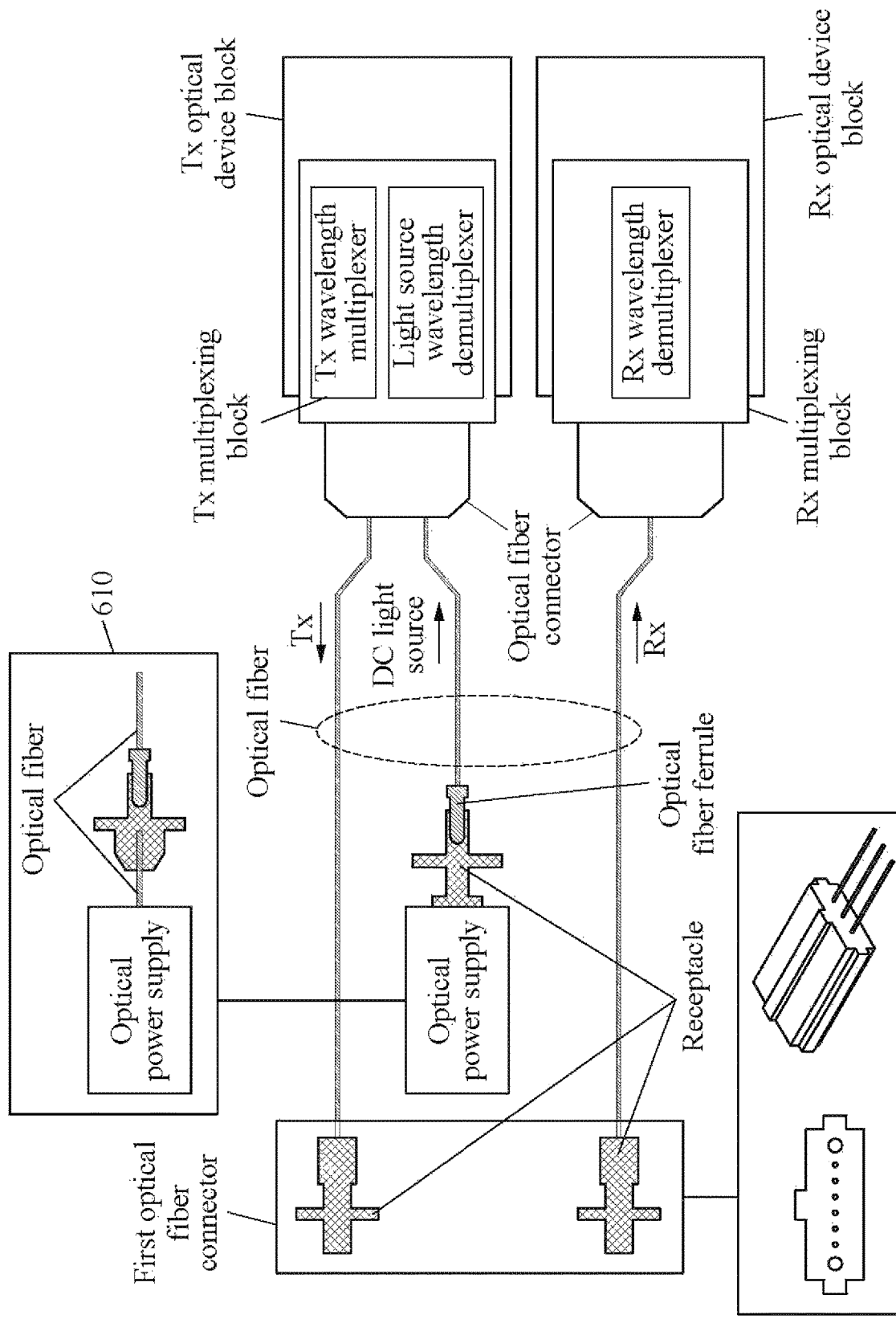
FIGS. 6A and 6B illustrate the structure of the optical module according to the second example embodiment.
Figure 6B:
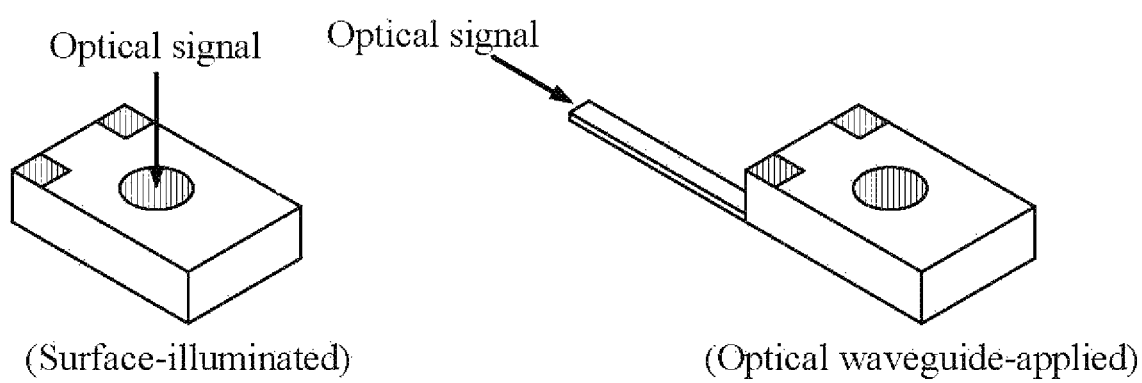

FIGS. 6A and 6B illustrate the structure of the optical module according to the second example embodiment.

The highly integrated optical transceiving block 220 provided in FIGS. 6A and 6B does not greatly differ in function from the highly integrated optical transceiving block 120, but is characterized in that the optical transmitter 221 and the optical receiver 222 are implemented separately. Thus, a transmission optical device block of FIG. 6A may include a silicon photonics-based optical modulating device, and an optical coupling function, and the like, and a reception optical device block of FIG. 6B may be implemented as a surface-illuminated photodiode or an optical waveguide-applied photodiode of a compound or a silicon germanium material according to the optical reception performance and the optical coupling structure.

Figure 7A:
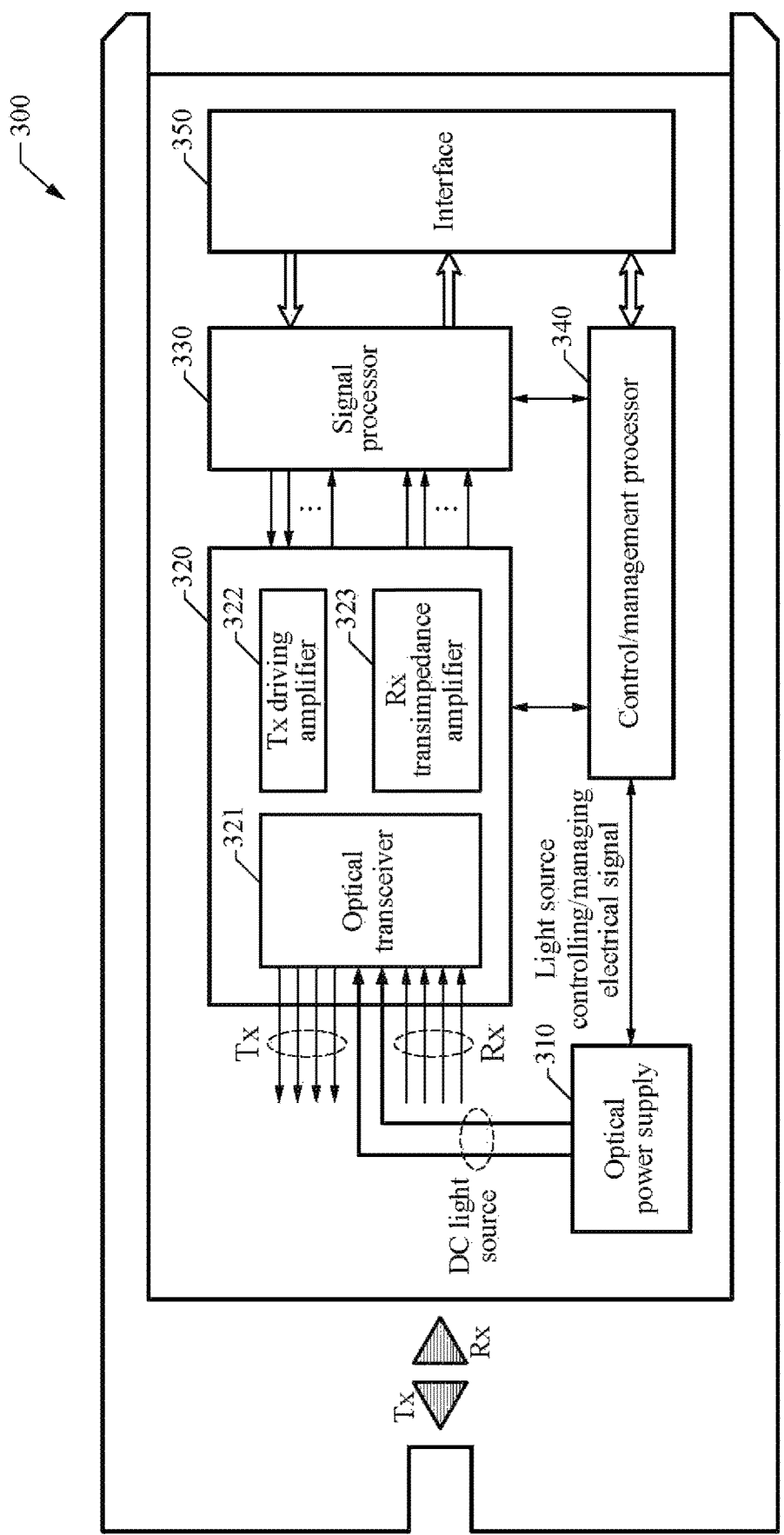
FIGS. 7A and 7B illustrate a structure of an optical module according to a third example embodiment.
Figure 7B:
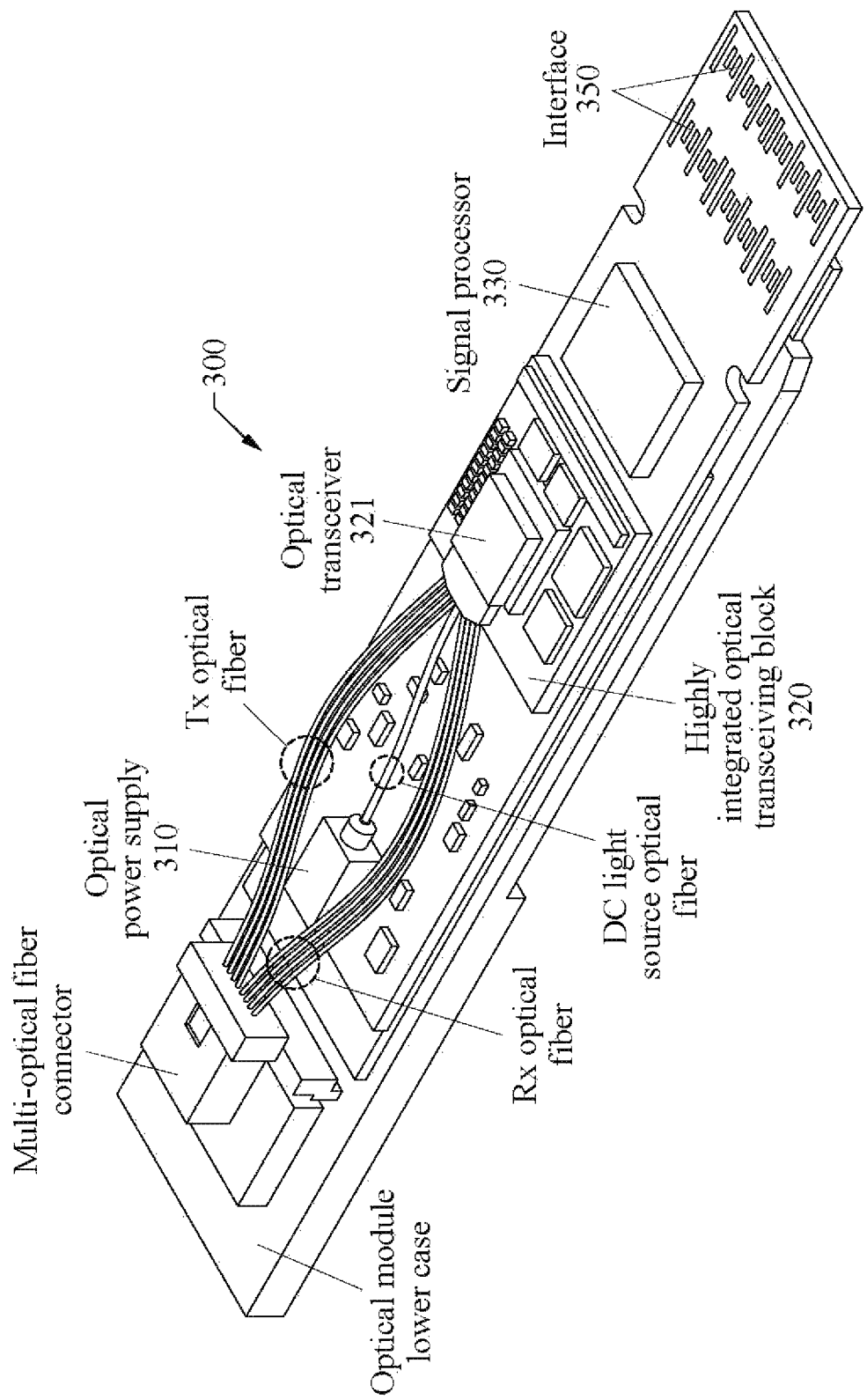

FIGS. 7A and 7B illustrate a structure of an optical module according to a third example embodiment.

Referring to FIGS. 7A and 7B, an optical module 300 having a parallel optical fiber connection structure may be provided. The overall flows of an optical transmission signal and an optical reception signal are similar to those in the first and second example embodiments. However, there is a slight difference in an optical interface part, and a multi-optical fiber connector may be used as the optical input/output form of the optical module 300 so that multiple optical fibers may be connected in an array form. In the parallel optical fiber connection structure as described above, light sources may have the same single wavelength, and thus the wavelength multiplexing function and the wavelength demultiplexing function are not required, and the optical fibers are connected respectively to channels constituting optical transmission and optical reception.

FIGS. 7A and 7B show an example of the structure of the optical module 300 including optical transmission 4 channels and optical reception 4 channels. In detail, two DC light sources having the same wavelength output from an optical power supply 310 may be connected to an optical transceiver 321 through DC light source optical fibers. Thereafter, the optical transceiver 321 may generate a total of 4 DC light source signals through 1:2 light intensity splitting using the two DC light sources received from the optical power supply 310 and then apply the generated DC light source signals to silicon photonics-based optical transmission parts to optically modulate the signals through the optical modulating devices according to electrical signals corresponding to data signals. In this example, the 4 modulated optical signals may be connected respectively to external optical fibers through a transmission and reception optical coupling block and output to the outside of the optical module 300.

In the case of optical reception, the 4-channel optical reception signals received through the multi-optical fiber connector of the optical module 300 may be received in the transmission and reception optical coupling block through the optical fiber connector. In this example, the received 4-channel optical reception signals may be transmitted to a transmission and reception optical device block by a reception optical waveguide of the transmission and reception optical coupling block. The 4-channel optical reception signals transmitted as described above may be converted into electrical signals at the reception optical device block and transmitted to the external device through a signal processor 330 and an interface 350.

FIGS. 8A through 8D illustrate the structure of the optical module according to the third example embodiment.

Figure 8A:
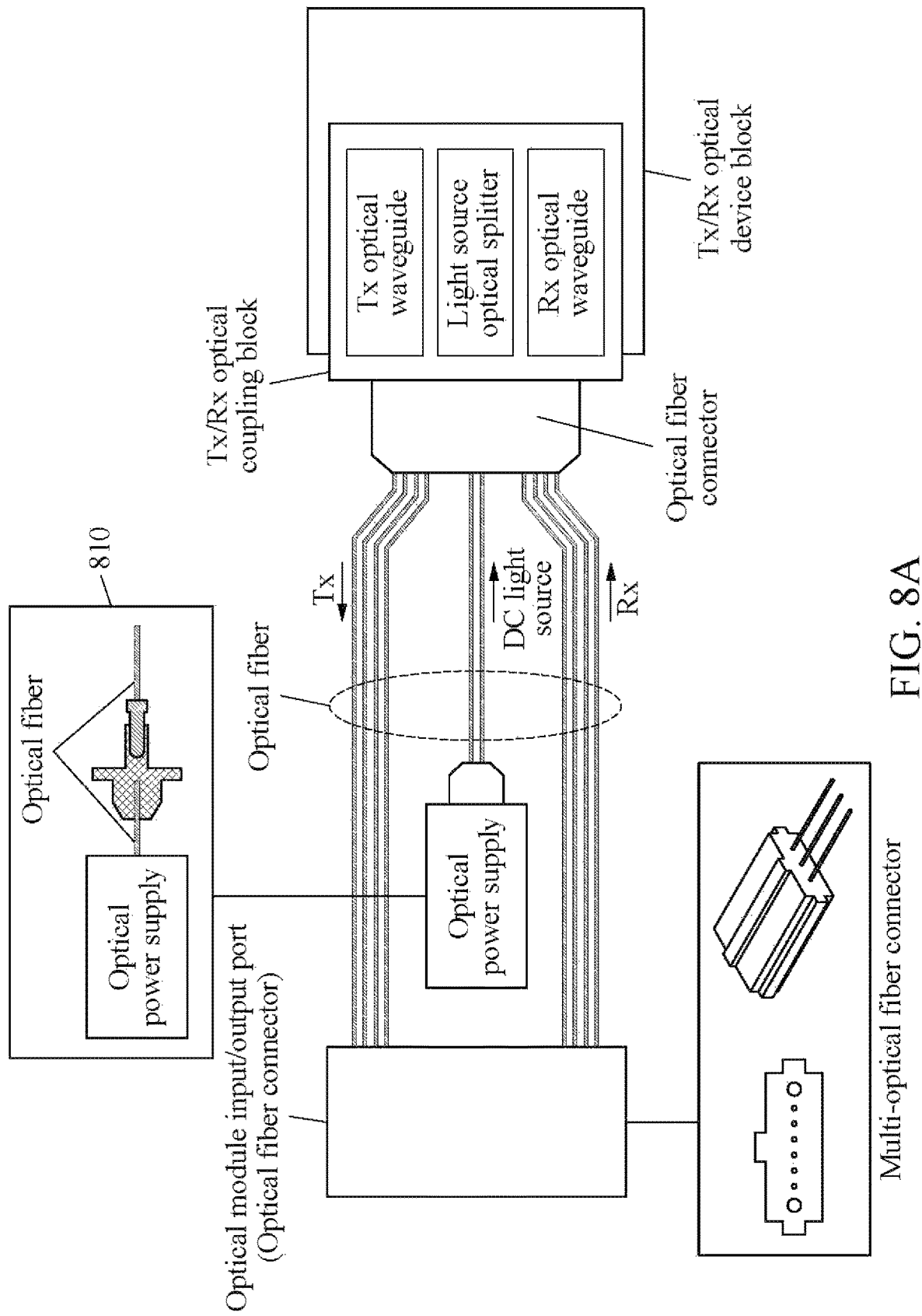
FIGS. 8A through 8D illustrate the structure of the optical module according to the third example embodiment.

Referring to FIG. 8A, one end of the optical module 300 is configured as an optical fiber connector, and the optical module 300 includes the optical power supply 310 and the optical transceiver 321. The optical power supply 310 may be configured to be drawn out in the form of an optical fiber from the main body of the optical power supply 310 and processes the end with a receptacle, as shown in the additional box 810. In this example, the optical module 300 may provide a degree of freedom in the position in which the optical power supply 310 is disposed, and a degree of freedom in the connection structure with a transmission and reception optical coupling block.

Figure 8B:
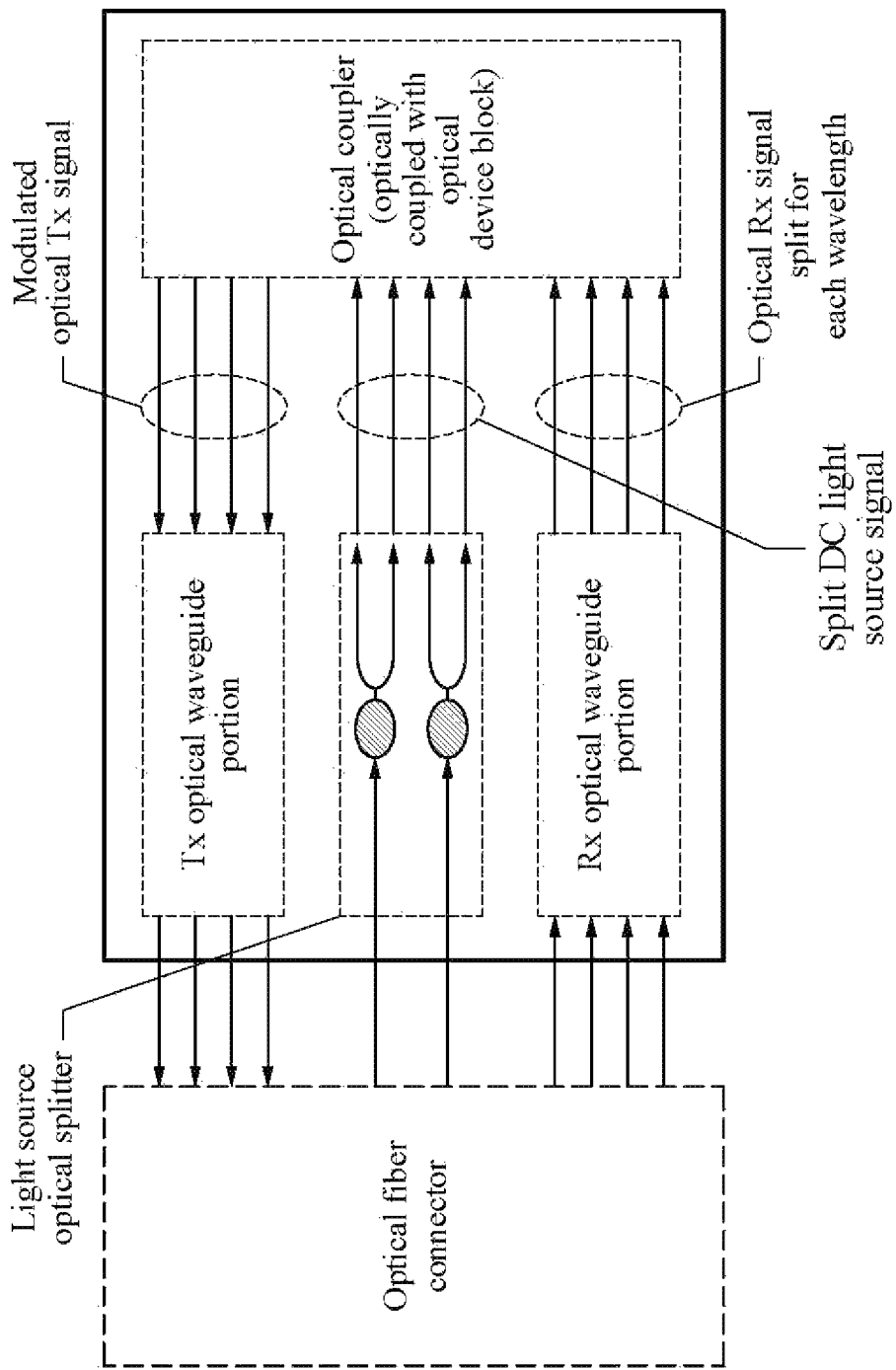

The transmission and reception optical coupling block may include a transmission optical waveguide portion, a light source optical splitter, a reception optical waveguide portion, an optical power connector, and an optical coupler (optically coupled with a transmission and reception optical device block), as shown in FIG. 8B. The transmission optical waveguide portion and the reception optical waveguide portion may be configured as a silica-based optical waveguide array and function as a pitch adapter in optical connection between the optical fiber connector and the transmission and reception optical device block.

Figure 8C:
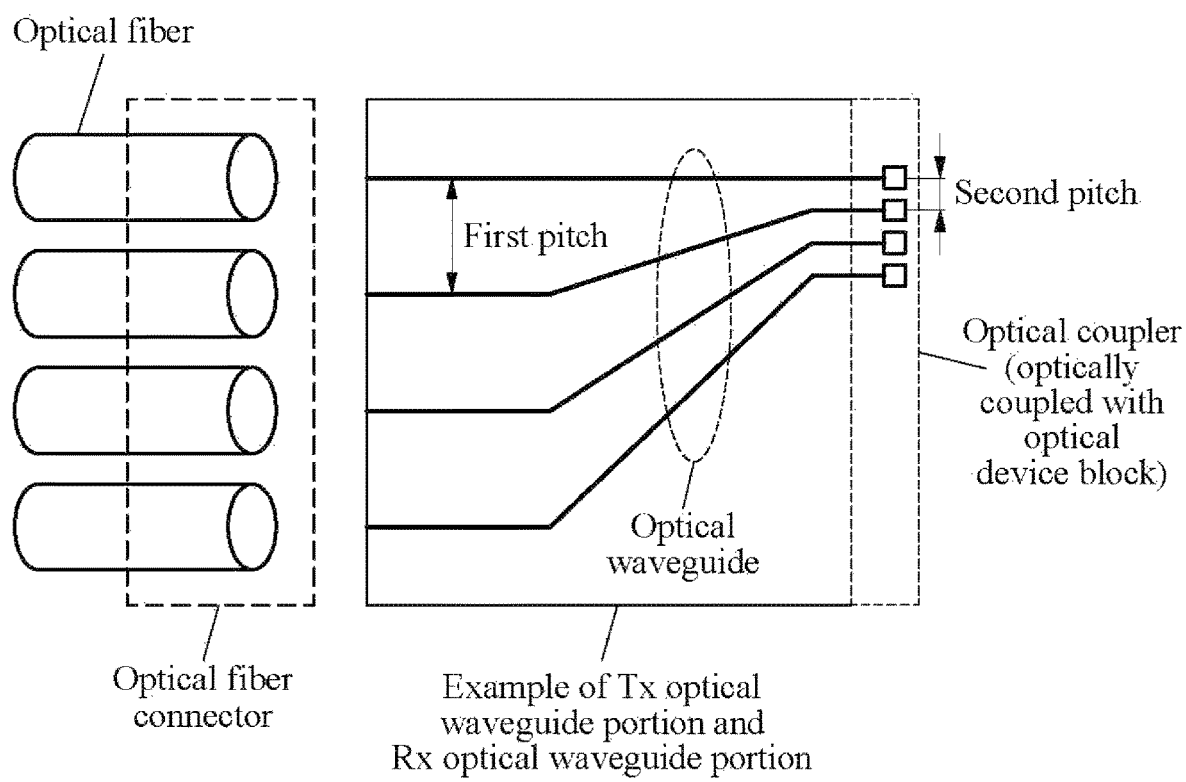

In this example, the pitch adapter may have a distance (first pitch) between the channel centers of portions of optical fibers connected through the optical fiber connector and a distance (second pitch) between the channel centers of portions thereof connected to the transmission and reception optical device block, wherein the first pitch and the second pitch may be different from each other due to physical and structural reasons, as shown in FIG. 8C. Accordingly, the distances (first pitch and second pitch) between the channel centers of both ends may be matched through the transmission optical waveguide portion and the reception optical waveguide portion. Further, the optical coupler is a portion (optical signal connection between internal chips) optically coupled between the transmission and reception optical coupling block and the transmission and reception optical device block, and may be configured using various optical coupling methods such as lateral optical coupling between chips or vertical optical coupling.

A light source optical splitter may split two DC light sources received from the optical power supply 310 into 1:2 light intensities to generate four DC light sources. The four DC light sources generated as described above may be used as an optical input to an optical modulating device disposed in an optical transmission part in the transmission and reception optical device block. The split ratio of the light source optical splitter provided in FIG. 8B is an example and may be 1:N depending on the configuration. In this example, the split DC light source signal of each channel has a light intensity reduced to 1/N.

In addition, the light source optical splitter is disposed in the transmission and reception optical coupling block as shown in FIG. 8B, but may also be disposed in the transmission and reception optical device block (the optical transmission part) as in the first example embodiment.

FIG. 8C shows a detailed configuration of the transmission optical waveguide portion and the reception optical waveguide portion of FIG. 8B. The left ends of the transmission optical waveguide and the reception optical waveguide are connected to external optical fibers and generally have a diameter of 125 μm, and if the optical fibers are arranged in an array form, the distance between the centers of the optical fibers should be at least 125 μm. The distance between channel centers of commercially available optical fiber arrays generally ranges between 127 μm and 250 μm.

The right ends of the transmission optical waveguide and the reception optical waveguide are connected to the transmission and reception optical device block, and should implement the distance (pitch) between the channel centers with a minimum distance allowed by the manufacturing process. This is for miniaturization and easy optical alignment of multiple channels. As the number of channels increases and the distance between the channel centers increases, there occurs an equal optical coupling loss and there is difficulty in optical alignment. As described above, the transmission and reception optical coupling block functions as a pitch adapter that alleviates the great difference in the distance between the channel centers required at both ends of the transmission and reception optical coupling block.

Figure 8D:
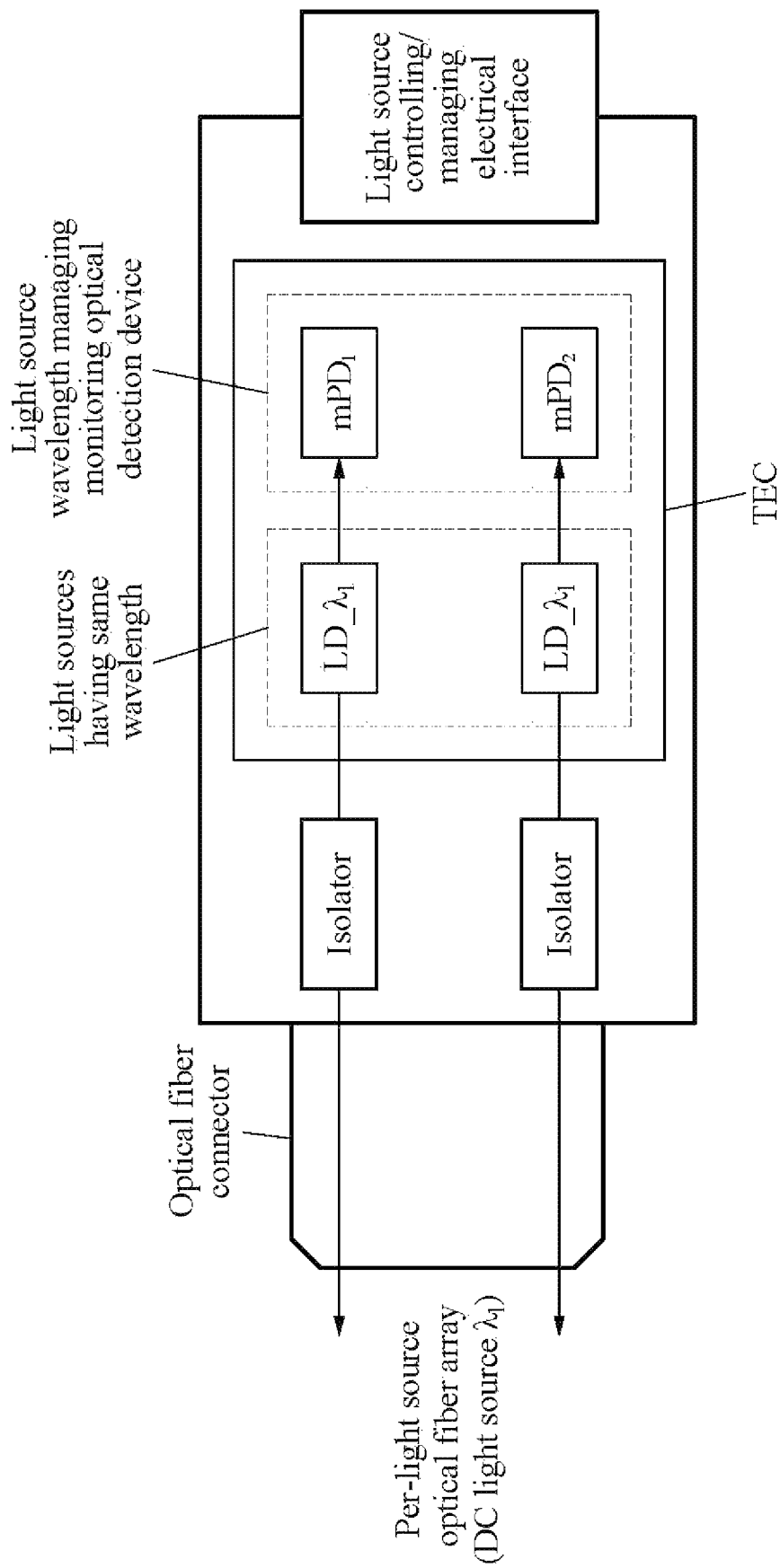

FIG. 8D shows an example of the optical power supply 310 applicable to the optical module 300 having a parallel optical fiber connection structure. The optical power supply 310 may include two light source chips $LD\_\lambda_1$ and $LD\_\lambda_2$ having the same wavelength, light source managing monitoring PDs $mPD_1$ and $mPD_2$, optical isolators, and an optical fiber connector. Unlike the first and second example embodiments, due to the parallel optical fiber connection structure, light sources having the same wavelength are required, and the light source chips $LD\_\lambda_1$ and $LD\_\lambda_2$ need to be capable of supplying sufficient optical power for light intensity splitting at the optical transceiver 321. That is because the split light intensity is the light intensity reduced to 1/N. Here, N is the number of light intensity splittings.

Figure 9A:
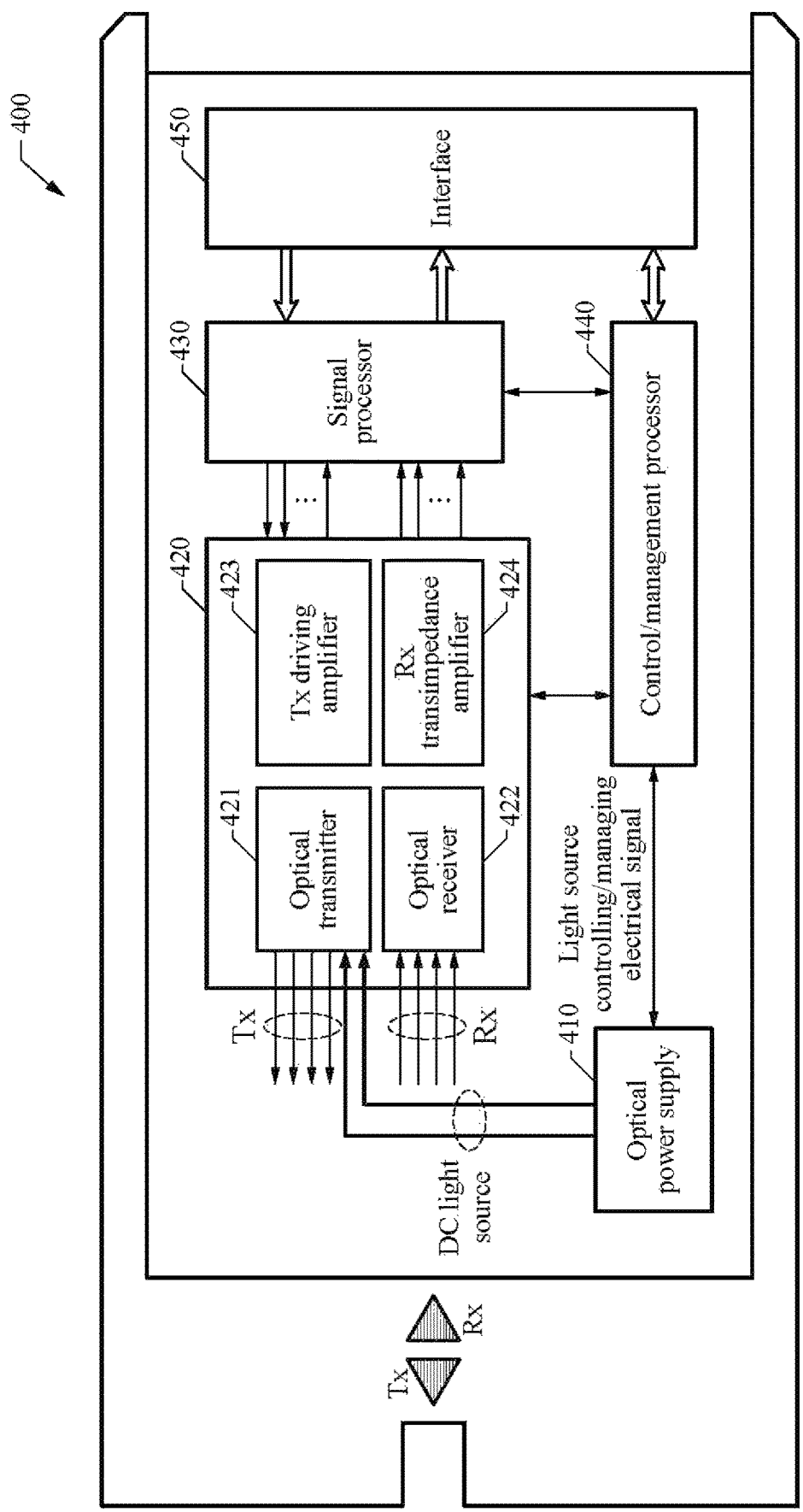
FIGS. 9A and 9B illustrate a structure of an optical module according to a fourth example embodiment.
Figure 9B:
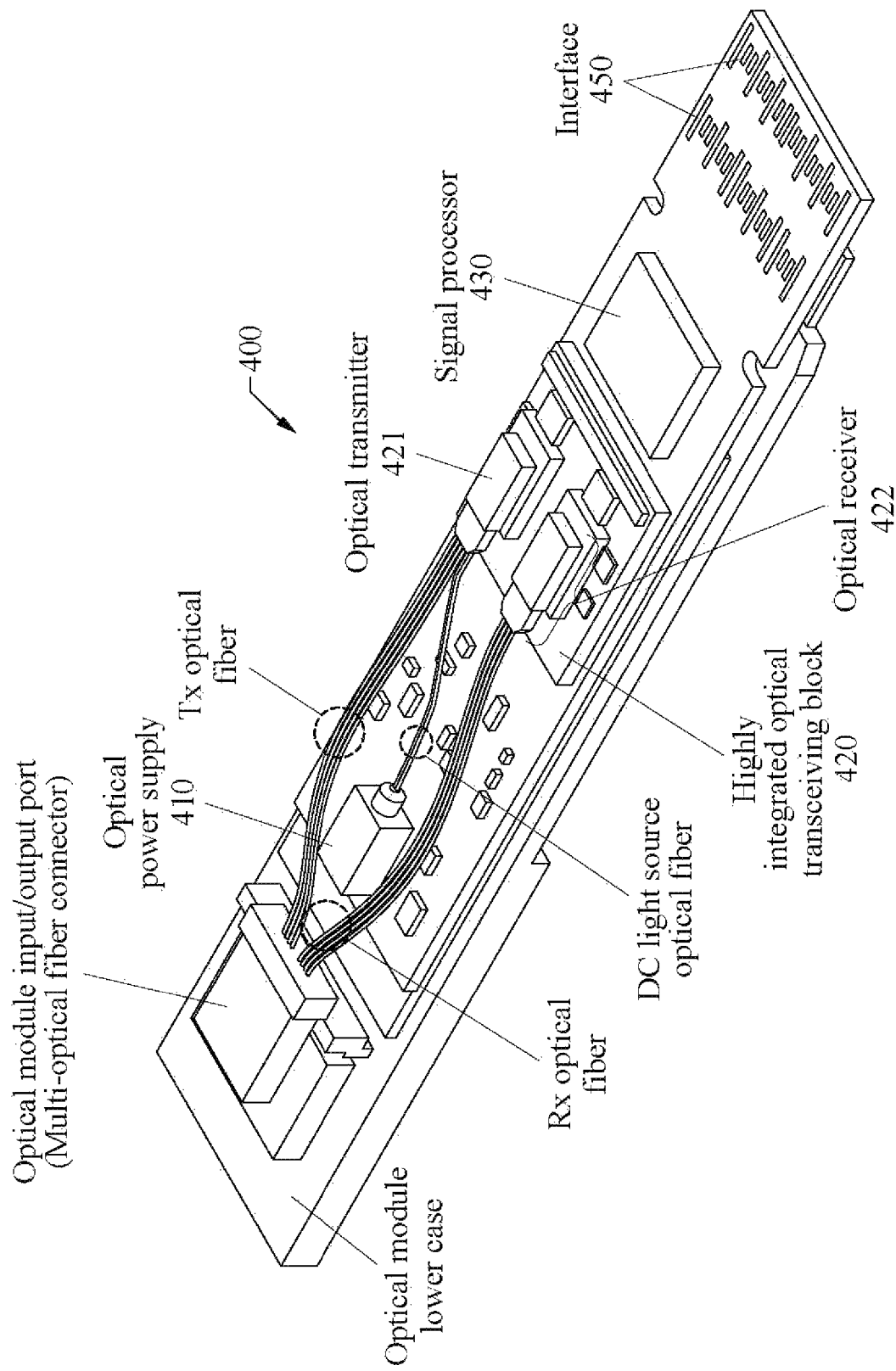

FIGS. 9A and 9B illustrate a structure of an optical module according to a fourth example embodiment.

The overall flows of an optical transmission signal and an optical reception signal in an optical module 400 of FIGS. 9A and 9B are similar to those in the first and second example embodiments. In addition, the overall structure is also the same as that in the third example embodiment. However, a highly integrated optical transceiving block 420 has a different internal configuration. The highly integrated optical transceiving block 420 according to the fourth example embodiment may have a structure in which an optical transmitter 421 and an optical receiver 422 are separated in view of the optical characteristics of the optical devices and the easy manufacturing. The operation of the fourth example embodiment is similar to that of the third example embodiment, and thus a description thereof will be omitted here.

Figure 10A:
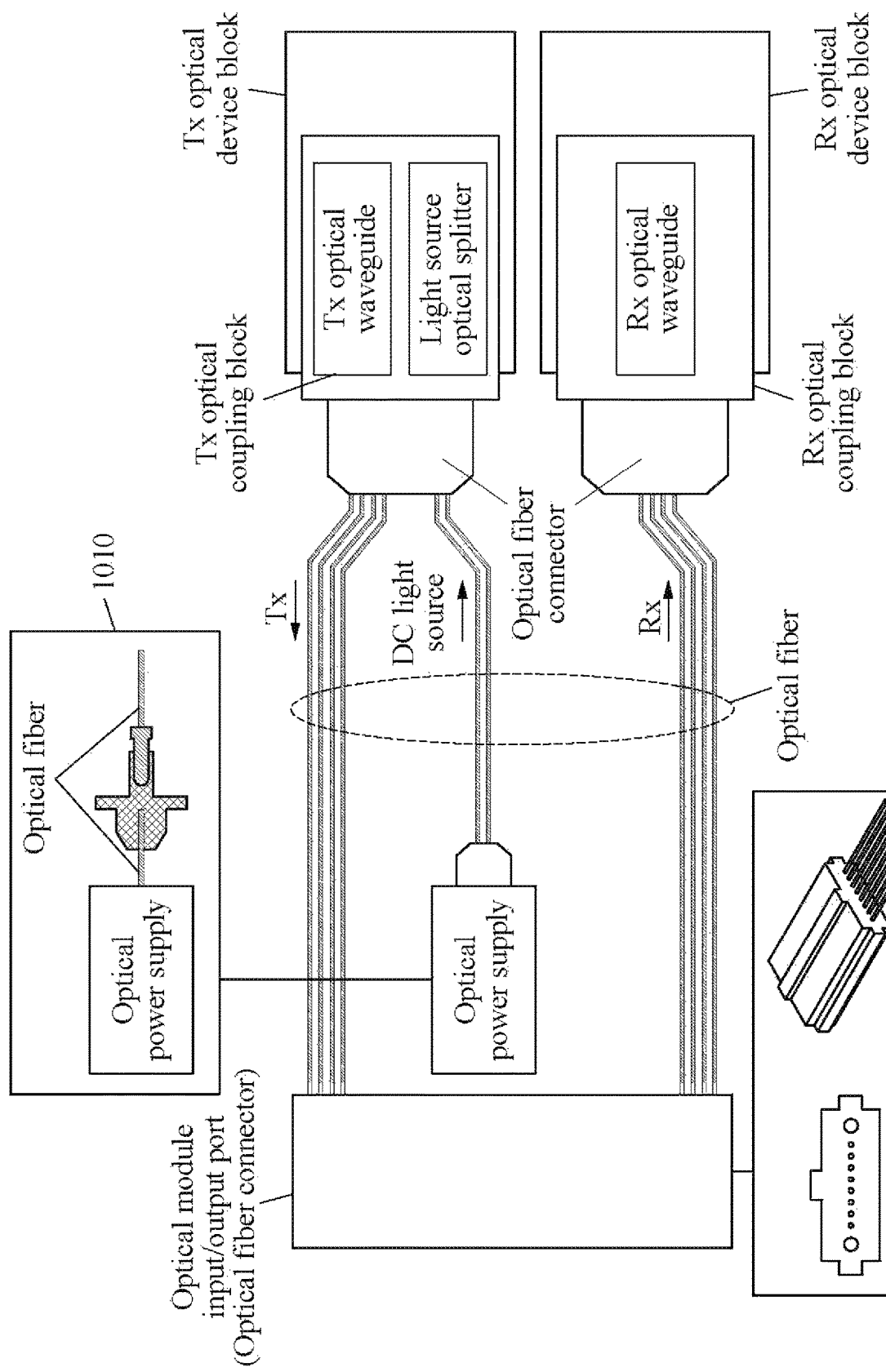
FIGS. 10A and 10B illustrate the structure of the optical module according to the fourth example embodiment.
Figure 10B:
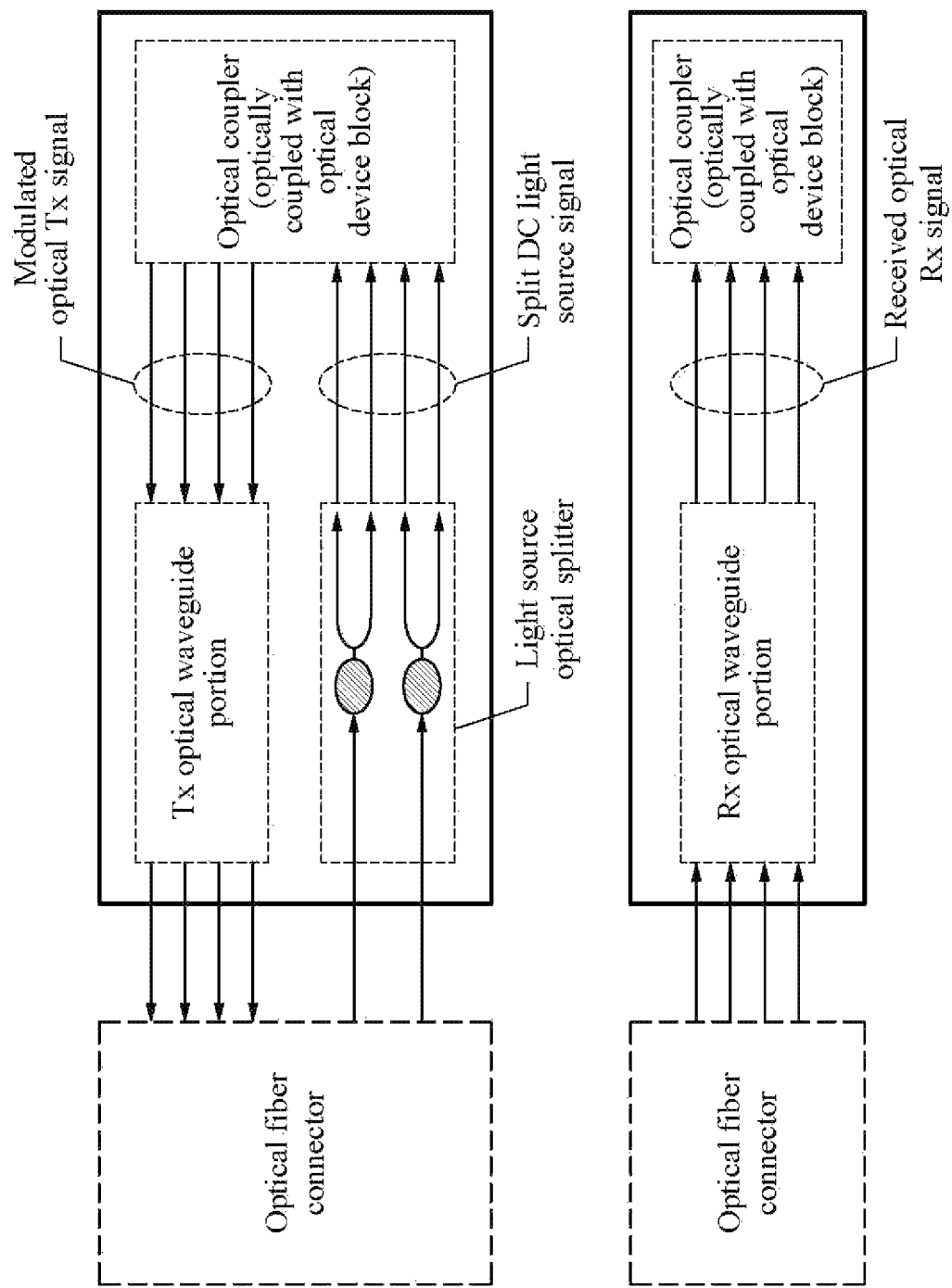

FIGS. 10A and 10B illustrate the structure of the optical module according to the fourth example embodiment.

A difference between the highly integrated optical transceiving block 420 of FIG. 10A and the example of FIG. 7A according to the third example embodiment lies in the structure in which the optical transmitter 421 and the optical receiver 422 are separated. An optical power supply 410 may be configured to be drawn out in the form of an optical fiber from the main body of the optical power supply 410 and processes the end with a receptacle, as shown in the additional box 1010. In this example, the optical module 400 may provide a degree of freedom in the position in which the optical power supply 410 is disposed, and a degree of freedom in the connection structure with a transmission and reception optical coupling block.

An optical reception device of the optical receiver 422 may be implemented as a surface-illuminated photodiode or an optical waveguide-applied photodiode of a compound or a silicon germanium material according to the optical reception performance and the optical coupling structure. However, unlike the example of FIG. 6B according to the second example embodiment, there is a difference in that four channels having the same wavelength are directly optically coupled to a photodiode, which is an optical detection device, without wavelength demultiplexing through parallel optical fibers (four bundles of optical fibers). The configurations and functions of the transmission optical coupling block and the reception optical coupling block in the optical transmitter 421 and the optical receiver 422 are the same as those shown in the third example embodiment.

The components described in the example embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the example embodiments may be implemented by software, and the software may be recorded on a recording medium. The components, the functions, and the processes described in the example embodiments may be implemented by a combination of hardware and software.

In the meantime, the method according to an example embodiment may be implemented as various recording media such as a magnetic storage medium, an optical read medium, and a digital storage medium after being implemented as a program that can be executed in a computer.

The implementations of the various technologies described in the specification may be implemented with a digital electronic circuit, computer hardware, firmware, software, or the combinations thereof. The implementations may be achieved as a computer program product, for example, a computer program tangibly embodied in a machine readable storage device (a computer-readable medium) to process the operations of a data processing device, for example, a programmable processor, a computer, or a plurality of computers or to control the operations. The computer programs such as the above-described computer program(s) may be recorded in any form of a programming language including compiled or interpreted languages, and may be executed as a standalone program or in any form included as another unit suitable to be used in a module, component, sub routine, or a computing environment. The computer program may be executed to be processed on a single computer or a plurality of computers at one site or to be distributed across a plurality of sites and then interconnected by a communication network.

The processors suitable to process a computer program include, for example, both general purpose and special purpose microprocessors, and any one or more processors of a digital computer of any kind. Generally, the processor may receive instructions and data from a read only memory, a random access memory or both of a read only memory and a random access memory. The elements of a computer may include at least one processor executing instructions and one or more memory devices storing instructions and data. In general, a computer may include one or more mass storage devices storing data, such as a magnetic disk, a magneto-optical disc, or an optical disc or may be coupled with them so as to receive data from them, to transmit data to them, or to exchange data with them. For example, information carriers suitable to embody computer program instructions and data include semiconductor memory devices, for example, magnetic Media such as hard disks, floppy disks, and magnetic tapes, optical Media such as compact disc read only memory (CD-ROM), and digital video disc (DVD), magneto-optical media such as floppy disks, ROM, random access memory (RAM), flash memory, erasable programmable ROM (EPROM), electrically erasable programmable ROM (EEPROM), and the like. The processor and the memory may be supplemented by a special purpose logic circuit or may be included by the special purpose logic circuit.

Furthermore, the computer-readable medium may be any available medium capable of being accessed by a computer and may include a computer storage medium.

Although the specification includes the details of a plurality of specific implementations, it should not be understood that they are restricted with respect to the scope of any invention or claimable matter. On the contrary, they should be understood as the description about features that may be specific to the specific example embodiment of a specific invention. Specific features that are described in this specification in the context of respective example embodiments may be implemented by being combined in a single example embodiment. On the other hand, the various features described in the context of the single example embodiment may also be implemented in a plurality of example embodiments, individually or in any suitable sub-combination. Furthermore, the features operate in a specific combination and may be described as being claimed. However, one or more features from the claimed combination may be excluded from the combination in some cases. The claimed combination may be changed to sub-combinations or the modifications of sub-combinations.

Likewise, the operations in the drawings are described in a specific order. However, it should not be understood that such operations need to be performed in the specific order or sequential order illustrated to obtain desirable results or that all illustrated operations need to be performed. In specific cases, multitasking and parallel processing may be advantageous. Moreover, the separation of the various device components of the above-described example embodiments should not be understood as requiring such the separation in all example embodiments, and it should be understood that the described program components and devices may generally be integrated together into a single software product or may be packaged into multiple software products.

In the meantime, example embodiments of the present invention disclosed in the specification and drawings are simply the presented specific example to help understand an example embodiment of the present invention and not intended to limit the scopes of example embodiments of the present invention. It is obvious to those skilled in the art that other modifications based on the technical idea of the present invention may be performed in addition to the example embodiments disclosed herein.

What is claimed is:

1. An optical module comprising:
   an interface electrically connected to an external device to receive a data signal to be transmitted;
   a signal processor configured to perform serialization and signal modulation on the received data signal;
   an optical transceiver configured to generate an optical transmission signal by receiving a direct current (DC) light source, in which a plurality of light sources having different wavelengths are multiplexed, from an optical power supply and performing optical modulation thereon through the serialized and modulated data signal; and
   an optical fiber connector configured to output the generated optical transmission signal to the external device and receive an optical reception signal from the external device,
   wherein the optical power supply is spaced a predetermined distance apart from a main heat source present in the optical module and connected to the optical transceiver through a DC light source optical fiber, and
   the optical transmission signal is generated when the DC light source output from the optical power supply is split for each wavelength through a light source wavelength demultiplexer included in a silica optical waveguide-based multiplexing block of the optical transceiver, optically modulated respectively through an optical modulating device included in a silicon photonics-based optical device block of the optical transceiver, and then multiplexed through an optical transmission wavelength multiplexer included in the multiplexing block.

2. The optical module of claim 1, wherein a transmission optical fiber and a reception optical fiber connected to the optical fiber connector and the DC light source optical fiber connected to the optical power supply are connected to the optical fiber connector of the optical transceiver in the form of a multi-optical fiber connector.

3. The optical module of claim 1, wherein a transmission optical fiber, a reception optical fiber, and the DC light source optical fiber perform a primary optical alignment with the multiplexing block based on a light intensity measured when an alignment optical signal input through a first alignment optical fiber is split through a first optical splitter according to a predetermined split ratio, passes through a second optical splitter via a first alignment optical waveguide, and reaches a second alignment optical fiber.

4. The optical module of claim 3, wherein the primary optical alignment is completed when the light intensity of the alignment optical signal reaching the second alignment optical fiber is at maximum.

5. The optical module of claim 1, wherein the silica optical waveguide-based multiplexing block and the silicon photonics-based optical device block constituting the optical transceiver perform a secondary optical alignment based on a light intensity measured when an alignment optical signal input through a first alignment optical fiber is split through a first optical splitter according to a predetermined ratio, passes through the optical device block via a second alignment optical waveguide, and reaches a second alignment optical fiber through a second optical splitter.

6. The optical module of claim 5, wherein the secondary optical alignment is completed when the light intensity of the alignment optical signal reaching the second alignment optical fiber is at maximum.

7. An optical module comprising:
- an interface electrically connected to an external device to receive a data signal to be transmitted;
- a signal processor configured to perform serialization and signal modulation on the received data signal;
- an optical transceiver configured to generate an optical transmission signal by receiving at least one direct current (DC) light source having the same wavelength from an optical power supply and performing optical modulation thereon through the serialized and modulated data signal; and
- an optical fiber connector configured to output the generated optical transmission signal to the external device and receive an optical reception signal from the external device, wherein the optical transceiver includes a silica optical waveguide-based optical coupling block and a silicon photonics-based optical device block, wherein the silica optical waveguide-based optical coupling block includes a light source optical splitter and a transmission optical waveguide, and the silicon photonics-based optical device block includes an optical modulating device, wherein the optical power supply is spaced a predetermined distance apart from a main heat source present in the optical module and connected to the optical transceiver through at least one DC light source optical fiber, and the optical transmission signal is generated when the at least one DC light source having the same wavelength output from the optical power supply is split through the light source optical splitter included in the silica optical waveguide-based optical coupling block of the optical transceiver, and optically modulated respectively through the optical modulating device included in the silicon photonics-based optical device block of the optical transceiver, and the generated optical transmission signal is then output to the external device through a plurality of transmission optical fibers via the transmission optical waveguide included in the optical coupling block.

8. The optical module of claim 7, wherein a plurality of transmission optical fibers and a plurality of reception optical fibers connected to the optical fiber connector and the DC light source optical fiber connected to the optical power supply perform a primary optical alignment with the silica optical waveguide-based optical coupling block based on a light intensity measured when an alignment optical signal input through a first alignment optical fiber is split through a first optical splitter according to a predetermined split ratio, passes through a second optical splitter via a first alignment optical waveguide, and reaches a second alignment optical fiber.

9. The optical module of claim 8, wherein the primary optical alignment is completed when the light intensity of the alignment optical signal reaching the second alignment optical fiber is at maximum.

10. The optical module of claim 7, wherein the silica optical waveguide-based optical coupling block and the silicon photonics-based optical device block constituting the optical transceiver perform a secondary optical alignment based on a light intensity measured when an alignment optical signal input through a first alignment optical fiber is split through a first optical splitter according to a predetermined ratio, passes through the optical device block via a second alignment optical waveguide, and reaches a second alignment optical fiber through a second optical splitter.

11. The optical module of claim 10, wherein the secondary optical alignment is completed when the light intensity of the alignment optical signal reaching the second alignment optical fiber is at maximum.

* * * * *